United States Patent
Loehr et al.

(10) Patent No.: US 10,667,119 B2
(45) Date of Patent: May 26, 2020

(54) UPLINK HARQ OPERATION FOR PROSE-ENABLED UES PARTICIPATING IN SIDELINK DISCOVERY OPERATION

(71) Applicant: Panasonic Intellectual Property Corporation of America, Torrance, CA (US)

(72) Inventors: Joachim Loehr, Hessen (DE); Prateek Basu Mallick, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/076,988

(22) PCT Filed: Jan. 27, 2017

(86) PCT No.: PCT/EP2017/051833
§ 371 (c)(1),
(2) Date: Aug. 9, 2018

(87) PCT Pub. No.: WO2017/140475
PCT Pub. Date: Aug. 24, 2017

(65) Prior Publication Data
US 2019/0058986 A1     Feb. 21, 2019

(30) Foreign Application Priority Data

Feb. 15, 2016 (EP) ..................................... 16155699

(51) Int. Cl.
*H04W 8/00* (2009.01)
*H04L 1/18* (2006.01)
(Continued)

(52) U.S. Cl.
CPC ............. *H04W 8/005* (2013.01); *H04L 1/08* (2013.01); *H04L 1/1812* (2013.01);
(Continued)

(58) Field of Classification Search
CPC .... H04W 8/005; H04W 24/08; H04L 1/1825; H04L 1/1887; H04L 1/1812; H04L 1/08
See application file for complete search history.

(56) References Cited

U.S. PATENT DOCUMENTS

| | | | |
|---|---|---|---|
| 2014/0086175 A1* | 3/2014 | Hakola | H04W 72/1242 370/329 |
| 2016/0142184 A1* | 5/2016 | Yi | H04L 1/08 714/748 |

(Continued)

FOREIGN PATENT DOCUMENTS

| | | |
|---|---|---|
| EP | 1 638 234 A1 | 3/2006 |
| WO | 2007/024559 A1 | 3/2007 |
| WO | 2015/113194 A1 | 8/2015 |

OTHER PUBLICATIONS

European Office Action, dated Jun. 13, 2019, for European Application No. 16155699.8-1219, 10 pages.
(Continued)

*Primary Examiner* — Christine Ng
(74) *Attorney, Agent, or Firm* — Seed IP Law Group LLP

(57) ABSTRACT

The invention relates to an improved transmission protocol for uplink data packet transmission. A transmission counter of the transmission protocol counts the number of transmissions the user terminal has performed for a data packet. The user terminal participates in sidelink discovery operation with other user terminals based on sidelink discovery gaps. The user terminal cannot transmit and/or receive signals under control of the transmission protocol when participating in sidelink discovery operation during the sidelink discovery gaps. A processor of the user terminal determines whether a retransmission of a data packet, which is triggered by the transmission protocol, was not performed because the transmission protocol operation collided with one of the sidelink discovery gaps. In case of collision, the processor (Continued)

operates the transmission counter such that the colliding retransmission of the data packet does not result in an increment of the transmission counter of the transmission protocol for the data packet.

10 Claims, 11 Drawing Sheets

(51) Int. Cl.
  *H04L 1/08* (2006.01)
  *H04W 24/08* (2009.01)
  *H04W 88/02* (2009.01)
(52) U.S. Cl.
  CPC .......... *H04L 1/1825* (2013.01); *H04L 1/1887* (2013.01); *H04W 24/08* (2013.01); *H04L 1/1864* (2013.01); *H04W 88/02* (2013.01)

(56) References Cited

U.S. PATENT DOCUMENTS

| | | | |
|---|---|---|---|
| 2016/0337008 A1 | 11/2016 | Li et al. | |
| 2016/0337088 A1 | 11/2016 | Quan et al. | |
| 2017/0230996 A1* | 8/2017 | Li | H04W 72/1284 |
| 2018/0035279 A1* | 2/2018 | Fujishiro | H04W 8/00 |
| 2018/0317278 A1* | 11/2018 | Fujishiro | H04W 92/18 |

OTHER PUBLICATIONS

3GPP TR 23.713 V13.0.0, "3rd Generation Partnership Project; Technical Specification Group Services and System Aspects; Study on extended architecture support for proximity-based services (Release 13)," Sep. 2015, 80 pages.

3GPP TR 36.843 V12.0.1, "3rd Generation Partnership Project; Technical Specification Group Radio Access Network; Study on LTE Device to Device Proximity Services; Radio Aspects (Release 12)," Mar. 2014, 50 pages.

3GPP TS 23.303 V13.2.0, "3rd Generation Partnership Project; Technical Specification Group Services and System Aspects; Proximity-based services (ProSe); Stage 2 (Release 13)," Dec. 2015, 122 pages.

3GPP TS 36.211 V8.9.0, "3rd Generation Partnership Project; Technical Specification Group Radio Access Network; Evolved Universal Terrestrial Radio Access (E-UTRA); Physical channels and modulation (Release 8)," Dec. 2009, 83 pages.

3GPP TS 36.211 V13.0.0, "3rd Generation Partnership Project; Technical Specification Group Radio Access Network; Evolved Universal Terrestrial Radio Access (E-UTRA); Physical channels and modulation (Release 13)," Dec. 2015, 141 pages.

3GPP TS 36.212 V13.0.0, "3rd Generation Partnership Project; Technical Specification Group Radio Access Network; Evolved Universal Terrestrial Radio Access (E-UTRA); Multiplexing and channel coding (Release 13)," Dec. 2015, 121 pages.

3GPP TS 36.213 V13.0.0, "3$^{rd}$ Generation Partnership Project; Technical Specification Group Radio Access Network; Evolved Universal Terrestrial Radio Access (E-UTRA); Physical layer procedures (Release 13)," Dec. 2015, 326 pages.

3GPP TS 36.300 V13.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Dec. 2015, 290 pages.

3GPP TS 36.321 V13.0.0, "3rd Generation Partnership Project; Technical Specification Group Radio Access Network; Evolved Universal Terrestrial Radio Access (E-UTRA); Medium Access Control (MAC) protocol specification (Release 13)," Dec. 2015, 82 pages.

3GPP TS 36.322 V13.0.0, "3rd Generation Partnership Project; Technical Specification Group Radio Access Network; Evolved Universal Terrestrial Radio Access (E-UTRA); Radio Link Control (RLC) protocol specification (Release 13)," Dec. 2015, 44 pages.

3GPP TS 36.331 V13.0.0, "3rd Generation Partnership Project; Technical Specification Group Radio Access Network; Evolved Universal Terrestrial Radio Access (E-UTRA); Radio Resource Control (RRC); Protocol specification (Release 13)," Dec. 2015, 507 pages.

Extended European Search Report, dated Oct. 4, 2016, for corresponding European Application No. 16155699.8-1851, 10 pages.

International Search Report, dated Apr. 24, 2017, for corresponding International Application No. PCT/EP2017/051833, 2 pages.

* cited by examiner

*SL-GapRequest* Information Element

```
-- ASN1START

SL-GapRequest-r13 ::=         SEQUENCE (SIZE (1..maxFreq)) OF SL-GapFreqInfo-r13

SL-GapFreqInfo-r13 ::=        SEQUENCE {
    carrierFreq-r13               ARFCN-ValueEUTRA-r9
    gapPatternList-r13            SL-GapPatternList-r13          OPTIONAL,
}

-- ASN1STOP
```

Fig. 12

SidelinkUE Information Message

```
-- ASN1START

SidelinkUEInformation-r12 ::=         SEQUENCE {
    criticalExtensions
        c1                                  CHOICE {
            sidelinkUEInformation-r12           SidelinkUEInformation-r12-IEs,
            spare3 NULL, spare2 NULL, sparel NULL
        },
        criticalExtensionsFuture            SEQUENCE {}
    }
}
...
SidelinkUEInformation-v13x0-IEs ::= SEQUENCE {
    commTxResourceReq121-r13            SL-CommTxResourceReqUC-r13      OPTIONAL,
    commTxResourceInfoReqRelay-r13      SEQUENCE {
        commTxResourceReqRelay-r13          SL-CommTxResourceReqUC-r13,
        ue-Type-r13                         ENUMERATED {relayUE, remoteUE}
    }                                                                   OPTIONAL,
    discTxResourceReq-v13x0             SEQUENCE {
        carrierFreqDiscTx-r13               INTEGER (1..maxFreq),
        discTxResourceReqAddFreq-r13        SL-DiscTxResourceReqPerFreqList-r13 OPTIONAL
    }                                                                   OPTIONAL,
    discTxResourceReqPS-r13             SL-DiscTxResourceReq-r13        OPTIONAL,
    discRxGapReq-r13                    SL-GapRequest-r13               OPTIONAL,
    discTxGapReq-r13                    SL-GapRequest-r13               OPTIONAL,
    discSysInfoReportList-r13           SL-SysInfoReportList-r13        OPTIONAL,
    nonCriticalExtension                SEQUENCE {}                     OPTIONAL
}

-- ASN1STOP
```

Fig. 13

SL-DiscConfig Information Element

```
-- ASN1START

SL-DiscConfig-r12            SEQUENCE {
    ...
    discTxInterFreqInfo-r13         CHOICE {
        release                         NULL,
        setup                           SEQUENCE {
            discTxCarrierFreq-r13           ARFCN-ValueEUTRA-r9
        }
    }                                                                         OPTIONAL,
    -- Need OR
        discTxRefCarrierDedicated-r13       SL-DiscTxRefCarrierDedicated-r13  OPTIONAL,
    -- Need OR
        discTxInfoInterFreqListExt-r13      SL-DiscTxInfoInterFreqListExt-r13
                                                                              OPTIONAL,
    -- Need ON
    }
    gapRequestsAllowedDedicated-r13     ENUMERATED {false, true}              OPTIONAL,   -- Need ON
    discRxGapConfig-r13                 CHOICE {
        release                             NULL,
        setup                               SL-GapConfig-r13
    }                                                                         OPTIONAL,
    -- Need ON
    discTxGapConfig-r13                 CHOICE {
        release                             NULL,
        setup                               SL-GapConfig-r13
    }                                                                         OPTIONAL,
    -- Need ON
    discSysInfoReportConfig-r13         CHOICE {
        release                             NULL,
        setup                               SL-DiscSysInfoReportFreqList-r13
    }                                                                         OPTIONAL
    -- Need ON
    ]]
}

-- ASN1STOP
```

Fig. 14

*SL-GapConfig* Information Element

```
-- ASN1START

SL-GapConfig-r13 ::=            SEQUENCE {
    gapPatternList-r13              SL-GapPatternList-r13
}

SL-GapPatternList-r13 ::=       SEQUENCE (SIZE (1..maxSL-GP-r13)) OF SL-GapPattern-r13

SL-GapPattern-r13 ::=           SEQUENCE {
    gapPeriod-r13                   ENUMERATED {rf4, rf7, rf8, rf14, rf16, rf28, rf32,
                                                rf64, rf128, rf256, rf512, rf1024,
spare},
    gapOffset-r12                   SL-OffsetIndicator-r12,
    gapSubframeBitmap-r13           BIT STRING (SIZE (1..10240))
}

-- ASN1STOP
```

| SL-GapConfig Field Descriptions |
|---|
| gapSubframeBitmap |
| Indicates the subframes of one or more individual gaps, not only covering the subframes of the associated discovery resources but also including *e.g.*, re-tuning delays. The UE and E-UTRAN signal bit strings of valid sizes only *i.e.*, sizes up to (10* gapPeriod). |

Fig. 15

UPLINK HARQ OPERATION FOR PROSE-ENABLED UES PARTICIPATING IN SIDELINK DISCOVERY OPERATION

BACKGROUND

Technical Field

The present disclosure relates to methods for operating a transmission protocol for uplink data transmission, particularly in a ProSe-enabled user terminal. The present disclosure is also providing the user equipment and base station for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 13.0.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PC1 and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

MAC Layer/Entity, RRC Layer, Physical Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by e.g., the 3GPP technical standard TS 36.321, current version 13.0.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321 incorporated herein by reference) for the RLC layer through logical channels, which are either control logical channels which carry control data (e.g., RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air.

The Physical layer is responsible for the actual transmission of data and control information via the air interface, i.e., the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e., the modulation and coding scheme, MCS), the number of physical resource blocks etc. More information on the functioning of the physical layer can be found in the 3GPP technical standard 36.213 current version 13.0.0, incorporated herein by reference.

The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signaling Radio Bearer (SRBs) and of radio bearers carrying user data (Data Radio Bearers, DRBs).

The radio link control (RLC) sublayer comprises mainly ARQ functionality and supports data segmentation and concatenation, i.e., RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e., RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer. The main services and functions of the RLC sublayer include:

Transfer of upper layer PDUs supporting AM, UM or TM data transfer;
Error Correction through ARQ;
Segmentation according to the size of the TB;
Resegmentation when necessary (e.g., when the radio quality, i.e., the supported TB size changes)
Concatenation of SDUs for the same radio bearer is FFS;
In-sequence delivery of upper layer PDUs;
Duplicate Detection;
Protocol error detection and recovery;
SDU discard;
Reset The ARQ functionality provided by the RLC layer will be discussed in more detail at a later part.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNode B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNode B), aided by insertion of a cyclic prefix in the transmitted signal.

The basic physical resource used for data transmission consists of a frequency resource of size BWgrant during one time interval, e.g., a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. Several PDCCHs can be transmitted in one subframe.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g., Resource Blocks, RBs) on which a user is allocated. Alternatively, this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212. "Multiplexing and channel coding", section 5.3.3.1 (current version v13.0.0 available at http://www.3gpp.org and incorporated herein by reference). For instance, the following DCI Formats can be used to carry a resource grant for the uplink.

Format 0: DCI Format 0 is used for the transmission of resource grants for the PUSCH, using single-antenna port transmissions in uplink transmission mode 1 or 2.

Format 4: DCI format 4 is used for the scheduling of the PUSCH, using closed-loop spatial multiplexing transmissions in uplink transmission mode 2.

The 3GPP technical standard TS 36.212, current version 13.0.0, defines in subclause 5.4.3, incorporated herein by reference, control information for the sidelink.

E-UTRAN Measurements—Measurement Gaps

The E-UTRAN can configure the UE to report measurement information e.g., to support the control of the UE mobility. The respective measurement configuration elements can be signaled via the RRCConnectionReconfiguration message. For instance, measurement gaps define time periods when no uplink or downlink transmissions will be scheduled, so that the UE may perform the measurements. The measurement gaps are common for all gap-assisted measurements. Inter-frequency measurements may require the configuration of measurement gaps, depending on the capabilities of the UE (e.g., whether it has a dual receiver). The UE identifies E-UTRA cells operating on carrier frequencies other than that of the serving cell. Inter-frequency measurements, including cell identification, or performed during periodic measurement gaps, unless the UE has more than one receiver. Two possible gap patterns can be configured by the network, each with a length of 6 ms: in gap pattern #0, the gap occurs every 40 ms, while in gap pattern #1 the gap occurs every 80 ms.

For example, the Reference Signal Received Power (RSRP) is measured by the UE over the cell-specific reference signals within the measurement bandwidth over a measurement period.

ARQ/Hybrid ARQ (HARQ) Schemes in LTE there are two levels of re-transmissions for providing reliability, namely, HARQ at the MAC layer and outer ARQ at the RLC layer. The RLC retransmission mechanism is responsible for providing error-free delivery of data to higher layer. To accomplish this, a (re)transmission protocol operates between the RLC entities in the receiver and transmitter, e.g., in the acknowledged mode. Although the RLC layer would be capable of handling transmission errors due to noise, unpredictable channel variations, etc., this is in most cases handled by the HARQ retransmission protocol of the MAC layer. The use of a retransmission mechanism in the RLC layer may therefore seem superfluous at first. However, this is not the case, and the use of both RLC- and MAC-based retransmission mechanisms is in fact well motivated by the differences in the feedback signaling. For instance, the RLC-ARQ mechanism takes care of the possible NACK to ACK errors that may occur with the MAC HARQ mechanism.

A common technique for error detection and correction in packet transmission systems over unreliable channels is called hybrid Automatic Repeat request (HARQ). Hybrid ARQ is a combination of Forward Error Correction (FEC) and ARQ. If a FEC encoded packet is transmitted and the receiver fails to decode the packet correctly (errors are usually checked by a CRC, Cyclic Redundancy Check), the receiver requests a retransmission of the packet RLC Retransmission Protocol When the RLC is configured to request retransmission of missing PDUs, it is said to be operating in Acknowledged Mode (AM). This is similar to the corresponding mechanism used in WCDMA/HSPA.

Overall, there are three operational modes for RLC: Transparent Mode (TM), Unacknowledged Mode (UM), and Acknowledged Mode (AM). Each RLC entity is configured by RRC to operate in one of these modes.

In Transparent Mode no protocol overhead is added to RLC SDUs received from higher layer. In special cases, transmission with limited segmentation/reassembly capability can be accomplished. It has to be negotiated in the radio bearer setup procedure, whether segmentation/reassembly is used. The transparent mode is e.g., used for very delay-sensitive services like speech.

In Unacknowledged Mode data delivery is not guaranteed since no retransmission protocol is used. The PDU structure includes sequence numbers for integrity observations in higher layers. Based on the RLC sequence number, the receiving UM RLC entity can perform reordering of the received RLC PDUs. Segmentation and concatenation are provided by means of header fields added to the data. The RLC entity in Unacknowledged mode is unidirectional, since there are no associations defined between uplink and downlink. If erroneous data is received, the corresponding PDUs are discarded or marked depending on the configuration. In the transmitter, the RLC SDUs which are not transmitted within a certain time specified by a timer are discarded and removed from the transmission buffer. The RLC SDUs, received from higher layer, are segmented/concatenated into RLC PDUs on sender side. On receiver side, reassembly is performed correspondingly. The unacknowledged mode is used for services where error-free delivery is of less importance compared to short delivery time, for example, for certain RRC signaling procedures, a cell broadcast service such as MBMS and voice over IP (VoIP).

In Acknowledged Mode the RLC layer supports error correction by means of an Automatic Repeat Request (ARQ) protocol, and is typically used for IP-based services such as file transfer where error-free data delivery is of primary interest. RLC retransmissions are for example based on RLC status reports, i.e., ACK/NACK, received from the peer RLC receiving entity. The acknowledged mode is designed for a reliable transport of packet data through retransmission in the presence of high air-interface bit error rates. In case of erroneous or lost PDUs, retransmission is conducted by the sender upon reception of an RLC status report from the receiver.

ARQ is used as a retransmission scheme for retransmission of erroneous or missed PDUs. For instance, by monitoring the incoming sequence numbers, the receiving RLC entity can identify missing PDUs. Then, an RLC status report can be generated at the receiving RLC side, and fed back to the transmitting RLC entity, requesting retransmission of missing or unsuccessfully decoded PDUs. The RLC status report can also be polled by the transmitter, i.e., the polling function is used by the RLC transmitter to obtain a status report from RLC receiver so as to inform the RLC transmitter of the reception buffer status. The status report provides positive acknowledgements (ACK) or negative acknowledgment information (NACK) on RLC Data PDUs or portions of them, up to the last RLC Data PDU whose HARQ reordering is complete. The RLC receiver triggers a status report if a PDU with the polling field set to '1' or when an RLC Data PDU is detected as missing. There are certain triggers defined in subclause 5.2.3 of TS36.322, current version 13.0.0, incorporated herein by reference, which trigger a poll for an RLC status report in the RLC transmitter. In the transmitter, transmission is only allowed for the PDUs within the transmission window, and the transmission window is only updated by the RLC status report. Therefore, if the RLC status report is delayed, the transmission window cannot be advanced and the transmission might get stuck.

The receiver sends the RLC status report to the sender when triggered.

As already mentioned before, in addition to data PDU delivery, control PDUs can be signaled between the peer entities.

MAC HARQ Protocol

The MAC layer comprises a HARQ entity, which is responsible for the transmit and receive HARQ operations. The transmit HARQ operation includes transmission and retransmission of transport blocks, and reception and processing of ACK/NACK signaling. The receive HARQ operation includes reception of transport blocks, combining of the received data and generation of ACK/NACK signaling. In order to enable continuous transmission while previous transport blocks are being decoded, up to eight HARQ processes in parallel are used to support multiprocess "Stop-And-Wait" (SAW) HARQ operation. Each HARQ process is responsible for a separate SAW operation and manages a separate buffer.

The feedback provided by the HARQ protocol is either an Acknowledgment (ACK) or a negative Acknowledgment (NACK). ACK and NACK are generated depending on whether a transmission could be correctly received or not (e.g., whether decoding was successful). Furthermore, in HARQ operation the eNB can transmit different coded versions from the original transport block in retransmissions so that the UE can employ incremental-redundancy-(IR)-combining to get additional coding gain via the combining gain.

If a FEC-encoded packet is transmitted and the receiver fails to decode the packet correctly (errors are usually checked by a CRC, Cyclic Redundancy Check), the receiver requests a retransmission of the packet. Generally (and throughout this document), the transmission of additional information is called "retransmission (of a packet)", and this retransmission could but does not necessarily mean a transmission of the same encoded information; it could also mean the transmission of any information belonging to the packet (e.g., additional redundancy information) e.g., by use of different redundancy versions.

In general, HARQ schemes can be categorized as either synchronous or asynchronous, with the retransmissions in each case being either adaptive or non-adaptive. Synchronous HARQ means that the retransmissions of transport blocks for each HARQ process occur at pre-defined (periodic) times relative to the initial transmission. Hence, no explicit signaling is required to indicate to the receiver the retransmission schedule, or e.g., the HARQ process number since it can be inferred from the transmission timing.

In contrast, asynchronous HARQ allows the retransmissions to occur at any time relative to the initial transmission, which offers the flexibility of scheduling retransmissions based on air-interface conditions. In this case however, additional explicit signaling is required to indicate e.g., the HARQ process to the receiver, in order to allow for a correct combining and protocol operation. In 3GPP LTE systems, HARQ operations with eight processes are used.

In LTE, asynchronous adaptive HARQ is used for the downlink, and synchronous HARQ for the uplink. In the uplink, the retransmissions may be either adaptive or non-adaptive, depending on whether new signaling of the transmission attributes is provided, e.g., in an uplink grant.

In uplink HARQ protocol operation (i.e., for acknowledging uplink data transmissions) there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions).

In case of a synchronous non-adaptive retransmission, the retransmission will use the same parameters as the previous uplink transmission, i.e., the retransmission will be signaled on the same physical channel resources, respectively uses the same modulation scheme/transport format. The redundancy version though will change, i.e., cycle through the predefined sequence of redundancy versions which is 0, 2, 3, 1.

Since synchronous adaptive retransmissions are explicitly scheduled via the PDCCH, the eNodeB has the possibility to change certain parameters for the retransmission. A retransmission could be for example scheduled on a different frequency resource in order to avoid fragmentation in the uplink, or eNodeB could change the modulation scheme or alternatively indicate to the user equipment what redundancy version to use for the retransmission. It should be noted that the HARQ feedback (ACK/NACK) and PDCCH signaling occurs at the same timing for UL HARQ FDD operation. Therefore, the user equipment only needs to check once whether a synchronous non-adaptive retransmission is triggered (i.e., only a NACK is received) or whether eNodeB requests a synchronous adaptive retransmission (i.e., PDCCH is also signaled).

The PHICH carries the HARQ feedback, which indicates whether the eNodeB has correctly received a transmission on the PUSCH. The HARQ indicator is set to 0 for a positive Acknowledgement (ACK) and 1 for a negative Acknowledgment (NACK). The PHICH carrying an ACK/NACK message for an uplink data transmission may be transmitted at the same time as the Physical Downlink Control Channel, PDCCH, for the same user terminal. With such a simultaneous transmission, the user terminal is able to determine what the PDCCH instructs the terminal to do, i.e., to perform a new transmission (new UL grant with toggled NDI) or a retransmission (referred to as adaptive retransmission) (new UL grant without toggled NDI), regardless of the PHICH content. When no PDCCH for the terminal is detected, the PHICH content dictates the UL HARQ behavior of the terminal, which is summarized in the following.

NACK: the terminal performs a non-adaptive retransmission, i.e., a retransmission on the same uplink resource as previously used by the same HARQ process ACK: the terminal does not perform any uplink retransmission and keeps the data in the HARQ buffer for that HARQ process. A further transmission for that HARQ process needs to be explicitly scheduled by a subsequent grant by PDCCH. Until the reception of such grant, the terminal is in a "suspension state".

This is illustrated in the following Table 11:

| HARQ feedback seen by the UE (PHICH) | PDCCH seen by the UE | UE behavior |
|---|---|---|
| ACK or NACK | New Transmission | New transmission according to PDCCH |
| ACK or NACK | Retransmission | Retransmission according to PDCCH (adaptive retransmission) |
| ACK | None | No (re)transmission, keep data in HARQ buffer and a PDDCH is required to resume retransmissions |
| NACK | None | Non-adaptive retransmission |

The schedule timing of the uplink HARQ protocol in LTE is exemplarily illustrated in FIG. 3. The eNB transmits to the UE a first uplink grant 301 on PDCCH, in response to which, the UE transmits first data 302 to the eNB on PUSCH. The timing between the PDCCH uplink grant and the PUSCH transmission is currently fixed to 4 ms. After receiving the first data transmission 302 from the UE, the eNB transmits feedback information (ACK/NACK) and possibly an UL grant 303 for the received transmission to the UE (alternatively, when the UL transmission was successful, the eNB could have triggered a new uplink transmission by transmitting a suitable second uplink grant). The timing between the PUSCH transmission and the corresponding PHICH carrying the feedback information is currently also fixed to 4 ms. Consequently, the Round Trip Time (RTT) indicating the next (re)transmission opportunity in the uplink HARQ protocol is 8 ms. After these 8 ms, the UE may transmit a retransmission 304 of previous data as instructed by the eNB. For the further operation, it is assumed that the retransmission 304 of a previously transmitted data packet was again not successful such that the eNodeB would instruct the UE to perform another retransmission (e.g., transmitting a NACK 305 as a feedback). In response thereto, the UE would thus perform a further retransmission 306.

At the top of FIG. 3, the subframe numbering is listed as well as an exemplary association of the HARQ processes with the subframes. As apparent therefrom, each of the 8 available HARQ processes is cyclically associated with a respective subframe. In the exemplary scenario of FIG. 3, it is assumed that the initial transmission 302 and the corresponding retransmissions thereof 304 and 306 are handled by the same HARQ process number 5.

Measurement gaps for performing measurements at the UE are of higher priority than HARQ retransmissions. Thus, whenever an HARQ retransmission collides with a measurement gap, the HARQ retransmission does not take place. On the other hand, whenever a HARQ feedback transmission over the PHICH collides with a measurement gap, the UE assumes an ACK as the content of the expected HARQ feedback.

There are several fields in the downlink control information to aid the HARQ operation:
New Data Indicator (NDI): toggled whenever a transmission of a transport block is scheduled, i.e., also referred to as initial transmission ("toggled" means that the NDI bit provided in the associated HARQ information has been changed/toggled compared to the value in the previous transmission of this HARQ process)
Redundancy Version (RV): indicates the RV selected for the transmission or retransmission
MCS: Modulation and Coding scheme HARQ operation is complex and will/cannot be described in full in this application, nor is it necessary for the full understanding of the disclosure. A relevant part of the HARQ operation is defined e.g., in 3GPP TS 36.321, version 13.0.0, clause 5.4.2 "HARQ operation", which will be recited in the following.

5.4.2 HARQ Operation 5.4.2.1 HARQ Entity

There is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

The number of parallel HARQ processes per HARQ entity is specified in [2], clause 8.

When the physical layer is configured for uplink spatial multiplexing [2], there are two HARQ processes associated with a given TTI. Otherwise there is one HARQ process associated with a given TTI.

At a given TTI, if an uplink grant is indicated for the TTI, the HARQ entity identifies the HARQ process(es) for which a transmission should take place. It also routes the received HARQ feedback (ACK/NACK information), MCS and resource, relayed by the physical layer, to the appropriate HARQ process(es).

When TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e., the TTI corresponding to TTI_BUNDLE_SIZE), regardless of whether a transmission in that TTI takes place or not (e.g., when a measurement gap occurs). A retransmission of a TTI bundle is also a TTI bundle. TTI bundling is not supported when the MAC entity is configured with one or more SCells with configured uplink.

TTI bundling is not supported for RN communication with the E-UTRAN in combination with an RN subframe configuration.

For transmission of Msg3 during Random Access (see subclause 5.1.5) TTI bundling does not apply.

For each TTI, the HARQ entity shall:
identify the HARQ process(es) associated with this TTI, and for each identified HARQ process:
if an uplink grant has been indicated for this process and this TTI:
if the received grant was not addressed to a Temporary C-RNTI on PDCCH and if the NDI provided in the associated HARQ information has been toggled compared to the value in the previous transmission of this HARQ process; or
if the uplink grant was received on PDCCH for the C-RNTI and the HARQ buffer of the identified process is empty; or
if the uplink grant was received in a Random Access Response:
if there is a MAC PDU in the Msg3 buffer and the uplink grant was received in a Random Access Response:
obtain the MAC PDU to transmit from the Msg3 buffer.
else:
obtain the MAC PDU to transmit from the "Multiplexing and assembly" entity:
deliver the MAC PDU and the uplink grant and the HARQ information to the identified HARQ process;
instruct the identified HARQ process to trigger a new transmission.
else:
deliver the uplink grant and the HARQ information (redundancy version) to the identified HARQ process;
instruct the identified HARQ process to generate an adaptive retransmission.
else, if the HARQ buffer of this HARQ process is not empty:
instruct the identified HARQ process to generate a non-adaptive retransmission.

When determining if NDI has been toggled compared to the value in the previous transmission the MAC entity shall ignore NDI received in all uplink grants on PDCCH for its Temporary C-RNTI.

5.4.2.2 HARQ Process

Each HARQ process is associated with a HARQ buffer.

Each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated modulo 4.

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.

The MAC entity is configured with a Maximum number of HARQ transmissions and a Maximum number of Msg3 HARQ transmissions by RRC: maxHARQ-Tx and maxHARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx.

When the HARQ feedback is received for this TB, the HARQ process shall:
set HARQ_FEEDBACK to the received value.
If the HARQ entity requests a new transmission, the HARQ process shall:
set CURRENT_TX_NB to 0;
set CURRENT_IRV to 0;
store the MAC PDU in the associated HARQ buffer;
store the uplink grant received from the HARQ entity;
set HARQ_FEEDBACK to NACK;
generate a transmission as described below.
If the HARQ entity requests a retransmission, the HARQ process shall:
increment CURRENT_TX_NB by 1;
if the HARQ entity requests an adaptive retransmission:
store the uplink grant received from the HARQ entity;
set CURRENT_IRV to the index corresponding to the redundancy version value provided in the HARQ information;
set HARQ_FEEDBACK to NACK;
generate a transmission as described below.
else if the HARQ entity requests a non-adaptive retransmission:
if HARQ_FEEDBACK=NACK:
generate a transmission as described below.
NOTE: When receiving a HARQ ACK alone, the MAC entity keeps the data in the HARQ buffer.
NOTE: When no UL-SCH transmission can be made due to the occurrence of a measurement gap, no HARQ feedback can be received and a non-adaptive retransmission follows.

To generate a transmission, the HARQ process shall:
if the MAC PDU was obtained from the Msg3 buffer; or
if Sidelink Discovery Gaps for Transmission are not configured by upper layers, and there is no measurement gap at the time of the transmission and, in case of retransmission, the retransmission does not collide with a transmission for a MAC PDU obtained from the Msg3 buffer in this TTI; or
if Sidelink Discovery Gaps for Transmission are configured by upper layers, and there is no measurement gap at the time of the transmission and, in case of retransmission, the retransmission does not collide with a transmission for a MAC PDU obtained from the Msg3 buffer, and there is no Sidelink Discovery Gap for Transmission in this TTI; or
if Sidelink Discovery Gaps for Transmission are configured by upper layers, and there is no measurement gap at the time of the transmission and, in case of retransmission, the retransmission does not collide with a transmission for a MAC PDU obtained from the Msg3 buffer, and there is a Sidelink Discovery Gap for Transmission, and there is no configured grant for transmission on SL-DCH in this TTI:
    instruct the physical layer to generate a transmission according to the stored uplink grant with the redundancy version corresponding to the CURRENT_IRV value;
    increment CURRENT_IRV by 1;
    if there is a measurement gap or Sidelink Discovery Gap for Reception at the time of the HARQ feedback reception for this transmission and if the MAC PDU was not obtained from the Msg3 buffer:
        set HARQ_FEEDBACK to ACK at the time of the HARQ feedback reception for this transmission.
After performing above actions, the HARQ process then shall:
if CURRENT_TX_NB=maximum number of transmissions−1:
    flush the HARQ buffer;

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the disclosure the terms "D2D", "ProSe" and "sidelink" are interchangeable.

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface.

In D2D communication, UEs transmit data signals to each other over a direct link using the cellular resources instead of through the base station (BS). D2D users communicate directly while remaining controlled under the BS, i.e., at least when being in coverage of an eNB. Therefore, D2D can improve system performance by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

With respect to the user plane protocols, part of the agreement from D2D communication perspective is given in the following (see also 3GPP TR 36.843 current version 12.0.1 section 9.2.2, incorporated herein by reference):

PDCP:
    1:M D2D broadcast communication data (i.e., IP packets) should be handled as the normal user-plane data.
    Header-compression/decompression in PDCP is applicable for 1:M D2D broadcast communication.
        U-Mode is used for header compression in PDCP for D2D broadcast operation for public safety;

RLC:
    RLC UM is used for 1:M D2D broadcast communication.
    Segmentation and Re-assembly is supported on L2 by RLC UM.
    A receiving UE needs to maintain at least one RLC UM entity per transmitting peer UE.
    An RLC UM receiver entity does not need to be configured prior to reception of the first RLC UM data unit.
    So far no need has been identified for RLC AM or RLC TM for D2D communication for user plane data transmission.

MAC:
    No HARQ feedback is assumed for 1:M D2D broadcast communication
    The receiving UE needs to know a source ID in order to identify the receiver RLC UM entity.
    The MAC header comprises a L2 target ID which allows filtering out packets at MAC layer.
    The L2 target ID may be a broadcast, group cast or unicast address.
        L2 Groupcast/Unicast: A L2 target ID carried in the MAC header would allow discarding a received RLC UM PDU even before delivering it to the RLC receiver entity.
        L2 Broadcast: A receiving UE would process all received RLC PDUs from all transmitters and aim to re-assemble and deliver IP packets to upper layers.
    MAC sub header contains LCIDs (to differentiate multiple logical channels).
    At least Multiplexing/de-multiplexing, priority handling and padding are useful for D2D.

In the Rel-12 timeframe, multi-carrier/inter-PLMN (Public Land Mobile Network) ProSe operation was limited to the receiving behavior, i.e., it is possible to configure UEs to monitor carriers for discovery belonging to another PLMN than the serving one. However, in Rel-12 the transmission of sidelink direct discovery announcements is limited to the intra-PLMN case and can be performed only in one of the configured serving cells, i.e., the PCell if the UE is in RRC_CONNECTED mode. Therefore, in case of load balancing issues due to a potential large amount of devices engaged in direct discovery transmissions, the eNB does not have the possibility to move the direct discovery signaling to other cells (other than the PCell) without performing an handover (i.e., changing the PCell). Additionally, it can be beneficial in some scenarios to configure for direct discovery a dedicated ProSe carrier that can be shared by a large amount of UEs among different operators, i.e., inter-PLMN configuration. The considerations above motivated the need for an enhanced direct discovery support for ProSe in Rel-13. Therefore, in Rel-13 it was agreed that for intra-PLMN and inter-PLMN, the serving eNB will signal on which frequencies and PLMN the discovery transmissions are allowed to be performed. The UE can read SIB19 of the other carriers to acquire the resources for direct discovery transmission. Essentially, in Rel-13 it is allowed to perform sidelink discovery transmissions in a non-serving carrier and/or secondary cell belonging to the same and possibly different PLMN as the serving cell.

ProSe Direct Communication Layer-2 Link

In brief, ProSe direct one-to-one communication is realized by establishing a secure layer-2 link over the PC5 interface between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g., self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v13.0.0 section 7.1.2 incorporated herein by reference:

Establishment of a secure layer-2 link over PC5.
IP address/prefix assignment.
Layer-2 link maintenance over PC5.
Layer-2 link release over PC5.

FIG. 4 illustrates how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.

2. UE-2 initiates the procedure for mutual authentication. The successful completion of the authentication procedure completes the establishment of the secure layer-2 link over PC5.

UEs engaging in isolated (non-relay) one-to-one communication may also use link-local addresses. The PC5 Signaling Protocol shall support keep-alive functionality that is used to detect when the UEs are not in ProSe Communication range, so that they can proceed with implicit layer-2 link release. The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related Identities 3GPP TS 36.300, current version 13.2.0, defines in subclause 8.3 the following identities to use for ProSe Direct Communication:

SL-RNTI: Unique identification used for ProSe Direct Communication Scheduling;

Source Layer-2 ID: Identifies the sender of the data in sidelink ProSe Direct Communication. The Source Layer-2 ID is 24 bits long and is used together with ProSe Layer-2 Destination ID and LCID for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.

Second bit string is the MSB part (16 bits) of the Destination Layer-2 ID and is carried within the MAC header. This is used for filtering packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer. In case of one-to-one communications, higher layer provides Source Layer-2 ID and Destination Layer-2 ID.

D2D Discovery—Models and Resource Allocation

ProSe Direct Discovery is defined as the procedure used by the ProSe-enabled UE to discover other ProSe-enabled UE(s) in its proximity using E-UTRA direct radio signals via PC5. FIG. 5 schematically illustrates the PC5 interface for device-to-device direct discovery.

Upper layer handles authorization for announcement and monitoring of discovery information. For this purpose, UEs have to exchange predefined signals, referred to as "discovery signals". By checking discovery signals periodically, a UE maintains a list of proximity UEs in order to establish a communication link when needed. Discovery signals should be detected reliably, even in low Signal-to-Noise Ratio (SNR) environments. To allow discovery signals to be transmitted periodically, resources for Discovery signals should be assigned.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler that could for example use information from the discovered UE for certain applications in the UE that are permitted to use this information e.g., "find a taxi nearby", "find me a coffee shop". Additionally depending on the information obtained, ProSe Direct Discovery can be used for subsequent actions e.g., to initiate ProSe Direct Communication.

The following models for ProSe Direct Discovery are defined in the standard 3GPP TS 23.303, current version 13.2.0, section 5.3 and all subsections thereof, incorporated herein by reference.

Model A ("I am Here"):
This model defines two roles for the ProSe-enabled UEs that are participating in ProSe Direct Discovery.
Announcing UE: The UE announces certain information that could be used by UEs in proximity that have permission to discover.
Monitoring UE: The UE that monitors certain information of interest in proximity of announcing UEs.

In this model the announcing UE broadcasts discovery messages at pre-defined discovery intervals and the monitoring UEs that are interested in these messages read them and process them. This model may be referred to as "I am here" since the announcing UE would broadcast information about itself e.g., its ProSe Application Code in the discovery message.

Model B ("Who is There?"/"are You There?"):
This model defines two roles for the ProSe-enabled UEs that are participating in ProSe Direct Discovery.
Discoverer UE: The UE transmits a request containing certain information about what it is interested to discover.
Discoveree UE: The UE that receives the request message can respond with some information related to the discoverer's request.

It can be referred to as "who is there/are you there" since the discoverer UE sends information for other UEs that would like to receive responses, e.g., the information can be about a ProSe Application Identity corresponding to a group and the members of the group can respond.

The content of the discovery information is transparent to the Access Stratum (AS), and no distinction is made in the AS for ProSe Direct Discovery models and types of ProSe Direct Discovery. The ProSe Protocol ensures that it delivers only valid discovery information to AS for announcement.

The UE can participate in announcing and monitoring of discovery information in both RRC_IDLE and RRC_CONNECTED state as per eNB configuration. The UE announces and monitors its discovery information subject to the half-duplex constraints.

Generally, device discovery is needed periodically. Further, D2D devices utilize a discovery message signaling protocol to perform device discovery. For example, a D2D-enabled UE can transmit its discovery message, and another D2D-enabled UE receives this discovery message and can use the information to establish a direct communication link. An advantage of a hybrid network is that if D2D devices are also in communication range of network infrastructure, network entities, like eNB, can additionally assist in the transmission or configuration of discovery messages. Coordination/control by the eNB in the transmission or configuration of discovery messages is also important to ensure that D2D messaging does not create interference with the cellular traffic controlled by the eNB. Additionally, even if some of the devices are outside of the network coverage range, in-coverage devices can assist in the ad-hoc discovery protocol.

At least the following two types of discovery procedure are defined for the purpose of terminology definition used further in the description.

UE autonomous resource selection (called Type 1 subsequently): A resource allocation procedure where resources for announcing discovery information are allocated on a non UE specific basis, further characterized by:
The eNB provides the UE(s) with the resource pool configuration used for announcing of discovery information. The configuration may be e.g., signaled in SIB.
The UE autonomously selects radio resource(s) from the indicated resource pool and announces discovery information.
The UE can announce discovery information on a randomly selected discovery resource during each discovery period.

Scheduled resource allocation (called Type 2 subsequently): A resource allocation procedure where resources for announcing discovery information are allocated on a per-UE-specific basis, further characterized by:
The UE in RRC_CONNECTED may request resource(s) for announcing of discovery information from the eNB via RRC. The eNB assigns resource(s) via RRC.
The resources are allocated within the resource pool that is configured in UEs for monitoring.

For UEs in RRC_IDLE the eNB may select one of the following options:
The eNB may provide a Type 1 resource pool for discovery information announcement in SIB. UEs that are authorized for Prose Direct Discovery use these resources for announcing discovery information in RRC_IDLE.
The eNB may indicate in SIB that it supports D2D but does not provide resources for discovery information announcement. UEs need to enter RRC Connected in order to request D2D resources for discovery information announcement.

For UEs in RRC_CONNECTED:
A UE authorized to perform ProSe Direct Discovery announcement indicates to the eNB that it wants to perform D2D discovery announcement
The eNB validates whether the UE is authorized for ProSe Direct Discovery announcement using the UE context received from MME.
The eNB may configure the UE to use a Type 1 resource pool or dedicated Type 2 resources for discovery information announcement via dedicated RRC signaling (or no resource).
The resources allocated by the eNB are valid until a) the eNB de-configures the resource (s) by RRC signaling or b) the UE enters IDLE.

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

To enhance inter-carrier discovery performance for the non-dedicated transceiver case, sidelink discovery gaps will be introduced to allow reusing one RF transmitter/receiver chain for direct discovery transmissions/receptions. These gaps should be under network control.

In Rel-13 two different sidelink discovery gaps were introduced, a discovery gap for reception and a discovery gap for sidelink discovery transmissions. The definitions of the two gaps are given here below, taken from the corresponding standard TS 36.321, version 13.0.0, clause 3.1, incorporated herein by reference:

Sidelink Discovery Gap for Reception: Time period during which the UE does not receive any channels in DL from any serving cell, except during random access procedure.

Sidelink Discovery Gap for Transmission: Time period during which the UE prioritizes transmission of sidelink discovery over transmission of channels in UL, if they occur in the same subframe, except during random access procedure.

Since in some cases of inter-frequency discovery, especially during the case of inter-PLMN discovery, the eNodeB may not know the resources that are being used on the other frequency for discovery. As a result, the eNodeB will not know when a UE will skip downlink reception and uplink transmission for inter-frequency discovery (if allowed to do so). This can lead to waste of resources. Therefore, the UE can request gaps for discovery reception and/or transmissions. In the request the UE can inform the eNB of the subframes (corresponding to the timing of the serving cell) on which the UE needs gaps for transmission and/or reception for sidelink discovery operation. The eNB will then, based on the provided information, configure the UE with sidelink discovery gaps for transmission and/or reception. The gaps created for discovery should take into account additional overhead which is needed for synchronization and subframe offset and should also consider the interruption time for the retuning of the RF unit to the other frequency used for the sidelink discovery.

The information element where UE requests for gaps is specified in 3GPP TS36.33 and referred to as IE SL-GapRequest, i.e., it indicates the gaps requested by the UE to receive or transmit sidelink discovery, intra or inter frequency.

FIG. 12 shows an SL-GapRequest Information Element.

The IE SL-GapRequest itself is carried in the SidelinkUE-Information message, an excerpt of which is provided below.

The SidelinkUEInformation message is used for the indication of sidelink information to the eNB.

Signaling radio bearer: SRB1
RLC-SAP: AM
Logical channel: DCCH
Direction: UE to E-UTRAN FIG. 13 shows a SidelinkUE Information Message.

As mentioned above, sidelink discovery gaps are network controlled, hence, the eNB configures the UE with the transmission respectively reception gaps. The Information element IE SL-DiscConfig is signaled within the RRCConnectionReconfiguration message to the UE, and specifies the dedicated configuration information for sidelink discovery.

FIG. 14 shows an SL-DiscConfig Information Element.
SL-GapConfig

The IE SL-GapConfig indicates the gaps assigned by E-UTRAN to enable the UE to receive or transmit sidelink discovery, intra or inter frequency.

FIG. 15 shows an SL-GapConfig Information Element.

For example, sidelink gaps are at least 40 ms long and may or may not span consecutive subframes. A non-negligible impact on the sidelink discovery gap length is given by the synchronization overhead that the UE would need to acquire the PSS/SSS (primary and Secondary synchronization signals) of the discovery carrier before performing the discovery operations.

Radio Protocol Architecture for ProSe Direct Discovery

FIG. 6 schematically illustrates a Radio Protocol Stack (Access Stratum) for ProSe Direct Discovery, where the access stratum protocol consists of only MAC and PHY. The AS layer performs the following functions:

Interfaces with upper layer (ProSe Protocol): The MAC layer receives the discovery message from the upper layer (ProSe Protocol). The IP layer is not used for transmitting the discovery message;

Scheduling: The MAC layer determines the radio resource to be used for announcing the discovery message received from upper layer;

Discovery PDU generation: The MAC layer builds the MAC PDU carrying the discovery message and sends the MAC PDU to the physical layer for transmission in the determined radio resource. No MAC header is added.

In the UE, the RRC protocol informs the discovery resource pools to MAC. RRC also informs allocated Type 2B resource for transmission to MAC. There is no need for a MAC header. MAC header for discovery does not comprise any fields based on which filtering on L2 could be performed. Discovery message filtering at the MAC level does not seem to save processing or power compared to performing filtering at the upper layers based on the Prose UE- and/or Prose Application ID. The MAC receiver forwards all received discovery messages to upper layers. MAC will deliver only correctly received messages to upper layers. It is assumed that L1 indicates to MAC whether a discovery messages has been received correctly. It is assumed that Upper Layers guarantee to deliver only valid discovery information to the Access Stratum.

ProSe Network Architecture and ProSe Entities

FIG. 7 illustrates a high-level exemplary architecture for a non-roaming case, including different ProSe applications in the respective UEs A and B, as well as a ProSe Application Server and ProSe function in the network. The example architecture of FIG. 7 is taken from TS 23.303 v.13.2.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling etc. related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality, such as:

Exchange of ProSe control information between ProSe-enabled UE and the ProSe Function over PC3 reference point.

Procedures for open ProSe Direct Discovery of other ProSe-enabled UEs over PC5 reference point.

Procedures for one-to-many ProSe Direct Communication over PC5 reference point.

Procedures to act as a ProSe UE-to-Network Relay. The Remote UE communicates with the ProSe UE-to-Network Relay over PC5 reference point. The ProSe UE-to-Network Relay uses layer-3 packet forwarding.

Exchange of control information between ProSe UEs over PC5 reference point, e.g., for UE-to-Network Relay detection and ProSe Direct Discovery.

Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.

Configuration of parameters (e.g., including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

Uplink HARQ Operation for ProSe-Enabled UEs

As has been explained above, 3GPP has continued standardizing the Proximity Services. However, the coordination of the Proximity Services and the legacy LTE(-A) operation is difficult and can be further improved.

BRIEF SUMMARY

Non-limiting and exemplary embodiments provide an improved transmission protocol operation for uplink data packet transmissions for a user terminal participating in sidelink discovery.

The independent claims provide non-limiting and exemplary embodiments. Advantageous embodiments are subject to the dependent claims.

According to several aspects described herein, the transmission protocol operation shall be improved. In order to discuss these aspects, the following exemplary assumptions are made. In particular, it is assumed that the user terminal operates a transmission protocol to control the uplink transmission (and retransmissions) of data packets (e.g., towards the serving base station). The transmission protocol operation involves the use of a transmission counter which counts the number of transmissions of a data packet the user terminal has performed so far; there is maximum limit of allowable transmissions. Furthermore, the transmission protocol, not only controls the triggering of initial transmissions, but also provides mechanisms to perform retransmissions of data packets. Particularly, retransmissions are performed in case the receiving side, e.g., the serving base station, provides a negative acknowledgment or specifically instructs the UE through a suitable uplink grant to perform a retransmission of the previously transmitted data packet.

Furthermore, it is assumed that the user equipment is enabled to participate in sidelink communication, particularly to participate in sidelink discovery operations with other sidelink-enabled user terminals, and to said purpose, is configured with sidelink discovery gaps (periods of time reserved for the UE to participate in sidelink discovery). In other words, the UE is enabled to discover other user terminals (which may involve transmitting/broadcasting suitable sidelink discovery messages) and/or be discovered by other user terminals (which may involve monitoring corresponding resources on which other user terminals may in turn transmit suitable sidelink discovery messages).

During these sidelink discovery gaps the UE operation towards the eNB is restricted in that it may not transmit and/or receive signals (such as the feedback information, or the actual packet (re)transmission) for the transmission protocol, particularly when participating in sidelink discovery operation. These sidelink discovery gaps may thus refer to transmission and/or reception.

Consequently, the user terminal is supposed to continuously operate the transmission protocol to perform uplink data packet transmissions and retransmissions, while at the same time being configured to participate in sidelink discovery operations with other user terminals. According to the first aspect described herein, the user terminal is configured so as to properly coordinate these two kinds of operations in an advantageous manner. As was explained above, particular retransmissions of data packets that are triggered by the transmission protocol eventually cannot be performed because they collide with one of the sidelink discovery gaps. According to the first aspect, the UE shall monitor for these collisions, and thus shall determine whether a retransmission of a data packet, which although being triggered by the transmission protocol (e.g., upon having received a corresponding uplink grant), was not performed because the transmission protocol operation collided in one or another manner with the sidelink discovery operation during the sidelink discovery gap(s). If such a collision is determined, the transmission protocol shall be operated such that this colliding, and not executed, retransmission will not result in the corresponding transmission counter for that data packet being incremented. In other words, the retransmission of the data packet shall not be counted by the UE as a transmission of the data packet and shall be ignored (i.e., shall not increase the transmission counter of the transmission protocol for that data packet), even though it was properly triggered by the transmission protocol, when this retransmission is eventually not performed due to being blocked by a sidelink discovery gap.

Therefore, the UE participating in sidelink discovery operation during the configured sidelink discovery gaps will handle retransmissions of data packets in a special way according to the first aspect. The first aspect thus provides a feature so as to not deprive the UE of one or more corresponding further retransmission opportunities to perform a retransmission for that data packet. Therefore, data packet loss, additionally incurred by the configured sidelink discovery gaps, can be avoided.

This advantage of avoiding data packet loss comes at the possible cost of an increased delay of the transmission protocol operation for a particular data packet. In particular, the improved transmission protocol operation of the first aspect will delay the overall transmission protocol operation since the transmission counter will reach the maximum allowable number of transmissions at a later point in time because the colliding retransmissions do no longer increase the corresponding transmission counter.

More specific variants of the first aspect deal with how the different sidelink discovery gaps actually collide with the operation of the transmission protocol in the UE and thus what the UE has to monitor exactly. In particular, there are two types of sidelink discovery gaps with which the UE can be configured, one referring to the sidelink discovery gap for transmission during which the UE can transmit sidelink discovery messages to other user terminals via a suitable sidelink connection. Accordingly, if the sidelink discovery gap for transmission is indeed to be used by the UE (e.g., the UE received a corresponding grant for transmitting a sidelink discovery message on the corresponding sidelink channel), the UE will prioritize this sidelink discovery message transmission over any other uplink transmission(s), including a retransmission triggered by the transmission protocol which is thus blocked (i.e., not performed). The UE will thus detect a collision, and will thus take care that the corresponding transmission counter is not increased as a result.

In addition or alternatively, the UE might be configured with a sidelink discovery gap for reception, during which the UE monitors corresponding resources of a sidelink connection as to whether other user terminals have transmitted corresponding sidelink discovery messages. During these sidelink discovery gaps for reception, the UE will not be able to receive other downlink signals including the feedback information of the transmission protocol for a previously transmitted data packet. Thus, the UE shall detect such a collision where a retransmission is triggered but not performed due to the missed feedback information, and shall thus take care that the corresponding transmission counter of the data packet is not increased as a result thereof.

There are different possibilities on how to achieve that the colliding retransmission of the data packet will not result in an increment of the transmission counter for that data packet. It is assumed that the transmission protocol provides for a step of incrementing the transmission counter every time the retransmission is triggered by the transmission protocol. In one option, this step is additionally taking into account whether or not the retransmission was actually not performed because of a collision with a sidelink discovery gap. In that case, according to the first option of the first aspect this step of incrementing the transmission counter would not be performed.

According to a second option of the first aspect, the currently specified step of the transmission protocol of incrementing the transmission counter by 1 every time that the retransmission is triggered, will be performed. However, this initial increment of the transmission counter is compensated by a further step of decreasing the transmission counter by one for the data packet in case it is determined that said retransmission (that initially triggered the increment of the transmission counter) could eventually not be performed due to a collision with the sidelink discovery gaps.

Further variants of the first aspect deal with the step of when a retransmission of a data packet is triggered according to the transmission protocol. For instance, in general the transmission protocol operated for the uplink data packet transmissions in the UE reacts to the feedback provided by the receiving entity (e.g., the serving base station) which may instruct the UE to perform or not perform a retransmission. The serving base station may provide a particular uplink grant to the UE to instruct the UE to perform a retransmission of a previously transmitted data packet; this may e.g., be accompanied by a positive acknowledgment even though a retransmission is triggered thereby. By requesting a retransmission through an uplink grant, the serving base station may adapt the parameters of the retransmission, e.g., a modulation scheme, a coding rate etc. On the other hand, the serving base station may simply provide the UE with a negative acknowledgment, such that the UE will trigger a retransmission of data in the non-empty buffer associated with that data packet; the UE will use basically the same transmission parameters for performing the retransmission.

Although not strictly necessary, the first aspect is particularly advantageous in scenarios where the operation of sidelink discovery is done on different carriers compared to the normal operation of the uplink data packet transmissions such that a retuning of hardware components of the UE will become necessary when switching between operation of the normal uplink data packet transmission and the sidelink discovery operation. For example, UEs that only have one receiver/transmitter chain will not be able to operate at the same time on these two different carriers, such that retuning the one receiver/transmitter chain to the respective different frequencies for sidelink discovery operation and normal uplink data packet transmission operation becomes necessary.

Furthermore, in order to ensure a synchronized operation in the UE and the serving base station of the UE, the serving base station shall also perform in a similar manner as the UE. In particular, collisions of the transmission protocol operation with the sidelink discovery operation of the UE during sidelink discovery gaps shall be detected as well by the serving base station and the transmission counter for data packets shall be operated accordingly, i.e., the transmission counter shall not be increased as a result of a triggered retransmission of a data packet of the UE in case the triggered retransmission could not be performed due to a collision with one of the sidelink discovery gaps.

A second aspect provides a different solution to the above mentioned problems and also improves the transmission protocol operation. All assumptions made in connection with the first aspect may equally be made also for the second aspect. In brief, the UE is assumed to operate a transmission protocol for controlling uplink data transmissions and retransmissions, which also involves the use of a transmission counter. The UE is configured with a parameter for operating the transmission counter(s), the parameter indicating a maximum number of allowable transmissions of a data packet. Optionally, when the transmission counter reaches this maximum number, the corresponding transmission buffer of the transmission protocol, storing the respective data packet, will be flushed, i.e., will be emptied. Corresponding feedback from the receiving side, e.g., the serving base station, is used to trigger new transmissions and retransmissions of previously transmitted data packets. Furthermore, the UE is assumed to be ProSe enabled, thus also participating in sidelink discovery operations, particularly using sidelink discovery gaps configured by the base station. The sidelink discovery gaps restrict the UE transmission protocol operation with the base station by causing collisions between the transmission protocol operation and the sidelink discovery operation.

In the same manner as for the first aspect, the user terminal according to the second aspect is configured so as to properly coordinate these two kinds of operations in an advantageous manner. For the second aspect, the transmission protocol operation shall include the step that the transmission counter for a data packet is incremented every time a retransmission for the data packet is triggered by the transmission protocol.

Then, in a corresponding manner as for the first aspect, the UE will monitor for these collisions, and thus shall determine whether a retransmission of a data packet, which although being triggered by the transmission protocol (e.g., upon having received a corresponding uplink grant), was not performed because the transmission protocol operation collided in one or another manner with the sidelink discovery operation during the sidelink discovery gap(s). In brief, one of two different types of collisions are to be monitored by the UE at least, one being the collision caused by a reception sidelink discovery gap during which the UE monitors corresponding resources of a sidelink connection as to whether other user terminals have transmitted corresponding sidelink discovery messages, for which the UE will not be able to receive other downlink signals, including the feedback information of the transmission protocol for a previously transmitted data packet. Secondly, transmission sidelink discovery gaps will prevent the UE to transmit sidelink discovery messages to other user terminals via a suitable sidelink connection at the same time as normal uplink retransmissions e.g., to the base station.

In case such collisions are detected by the UE, the second aspect provides that an increased maximum number of allowable transmissions is to be used for operating the corresponding transmission counter thus taking into account that the transmission counter was, and possibly will be, incremented although the triggered retransmission that caused the increment was not performed since it was blocked by the sidelink discovery operation during the sidelink discovery gaps.

There are different ways of how to increase the maximum number of allowable transmissions applicable to the operation of the corresponding transmission counter(s).

One option is that a further, second, transmission counter parameter is used for a transmission counter operated for a data packet for which a collision has been detected. For example, the UE can be configured with this second transmission counter parameter by the serving base station, and the maximum number of allowable transmissions, indicated by this second transmission counter parameter, is increased in comparison to the maximum number of allowable transmissions set by the first transmission counter parameter according to which the transmission counter in the UE was initially operated.

Optionally, the eNodeB is aware of the length of the sidelink discovery gaps and thus is aware of how many retransmission opportunities will be blocked in the UE by the sidelink discovery gaps. The eNodeB will thus set the second transmission counter parameter so as to increase the maximum number of allowable transmissions for a data packet in a corresponding manner. For instance, a sidelink discovery gap of length 40 ms may block up to 5 retransmission opportunities (recurring every 8 ms) such that the maximum number of allowable transmissions for a data packet can be increased as well by 5.

A second option is that the UE will autonomously increment the maximum number of allowable transmissions for a data packet every time it detects a collision as explained above. In particular, the transmission protocol operation will increment the transmission counter whenever a retransmission is triggered, but the UE will—in concordance therewith—increment the maximum number of allowable transmissions applicable to the corresponding, incremented, transmission counter in case of collision, i.e., in case the UE determines that the triggered retransmission was not performed because the transmission protocol operation collided with one of the sidelink discovery gaps.

Therefore, the transmission counter will not reach the upper limit, i.e., the maximum number of allowable transmissions, too soon, and the UE will thus not be deprived of one or more corresponding further retransmission opportunities to perform a retransmission for the data packet. Therefore, data packet loss, additionally incurred by the configured sidelink discovery gaps, can be avoided.

Correspondingly, in one general first aspect, the techniques disclosed here feature a user terminal operating a transmission protocol for uplink data packet transmission in a communication system. A transmission counter is configured for the transmission protocol of the user terminal for counting the number of transmissions the user terminal has performed for a data packet. The user terminal is configured to participate in sidelink discovery operation with other user terminals based on sidelink discovery gaps configured for the user equipment. The user terminal cannot transmit and/or receive signals under control of the transmission protocol when participating in sidelink discovery operation during the sidelink discovery gaps. The user terminal comprises a processor which determines whether a retransmission of a data packet, which is triggered by the transmission protocol, was not performed because the transmission protocol operation collided with one of the sidelink discovery gaps. Further, in case of collision, the processor operates the transmission counter such that the colliding retransmission of the data packet does not result in an increment of the transmission counter of the transmission protocol for the data packet.

Correspondingly, in one general second aspect, the techniques disclosed here feature a user terminal operating a transmission protocol for uplink data packet transmission in a communication system. A transmission counter is configured for the transmission protocol of the user terminal for counting the number of transmissions the user terminal has performed for a data packet. The user terminal is configured with a first transmission counter parameter setting a maximum number of allowable transmissions of a data packet for the operation of the transmission counter. The user terminal is configured to participate in sidelink discovery operation with other user terminals based on sidelink discovery gaps configured for the user equipment. The user terminal cannot transmit and/or receive signals under control of the transmission protocol when participating in sidelink discovery operation during the sidelink discovery gaps. The user terminal comprises a processor which increments the transmission counter for a data packet when a retransmission of the data packet is triggered by the transmission protocol. Further, the processor determines whether the triggered retransmission of the data packet was not performed because the transmission protocol operation collided with one of the sidelink discovery gaps. Then, in case of collision, the processor uses for the operation of the transmission counter of the data packet a second transmission counter parameter so as to increase the maximum number of allowable transmissions of the data packet for the transmission counter.

Correspondingly, in one general first aspect, the techniques disclosed here feature a base station for receiving uplink data packet transmissions from a user terminal in a communication system. The user terminal operates a transmission protocol for the uplink data packet transmission. A first transmission counter is configured for the transmission protocol of the user terminal for counting the number of transmissions the user terminal has performed for a data packet. A second transmission counter is configured in the base station for counting the number of transmission the user terminal has performed for a data packet. The user terminal is configured by the base station to participate in sidelink discovery operation with other user terminals based on sidelink discovery gaps. The user terminal cannot transmit and/or receive signals under control of the transmission protocol when participating in sidelink discovery operation during the sidelink discovery gaps. The base station comprises a processor that determines whether a retransmissions of a data packet, which is triggered by the transmission protocol of the user terminal, was not performed by the user terminal because the transmission protocol operation collided with one of the sidelink discovery gaps. The, in case of collision, the processor operates the second transmission counter such that the colliding transmission of the data packet does not result in an increment of the second transmission counter of the transmission protocol for the data packet.

Correspondingly, in one general first aspect, the techniques disclosed here feature a method for operating a transmission protocol in a user terminal for uplink data packet transmission in a communication system. A transmission counter is configured for the transmission protocol of the user terminal for counting the number of transmissions the user terminal has performed for a data packet. The user terminal is configured to participate in sidelink discovery operation with other user terminals based on sidelink discovery gaps configured for the user equipment. The user terminal cannot transmit and/or receive signals under control of the transmission protocol when participating in sidelink discovery operation during the sidelink discovery gaps. The method comprises determining by the user terminal whether a retransmission of a data packet, which is triggered by the transmission protocol, was not performed because the transmission protocol operation collided with one of the sidelink discovery gaps. Then, in case of collision, the user terminal operates the transmission counter such that the colliding retransmission of the data packet does not result in an increment of the transmission counter of the transmission protocol for the data packet.

Correspondingly, in one general second aspect, the techniques disclosed here feature a base station for receiving uplink data packet transmissions from a user terminal in a communication system. The terminal operates a transmission protocol for the uplink data packet transmission. A first transmission counter is configured for the transmission protocol of the user terminal for counting the number of transmissions the user terminal has performed for a data packet. A second transmission counter is configured in the base station for counting the number of transmission the user terminal has performed for a data packet. A first transmission counter parameter sets a maximum number of allowable transmissions of the data packet for the operation of the first and second transmission counters. The user terminal is configured by the base station to participate in sidelink discovery operation with other user terminals based on sidelink discovery gaps. The user terminal cannot transmit and/or receive signals under control of the transmission protocol when participating in sidelink discovery operation during the sidelink discovery gaps. The base station comprises a processor that increments the second transmission counter for a data packet when a retransmission of the data packet is triggered by the transmission protocol in the user terminal. The processor then determines whether a retransmissions of a data packet, which is triggered by the transmission protocol of the user terminal, was not performed by the user terminal because the transmission protocol operation collided with one of the sidelink discovery gaps. In case of collision, the processor uses for the operation of the second transmission counter of the data packet a second transmission counter parameter so as to increase the maximum number of allowable transmissions of the data packet for the second transmission counter.

Correspondingly, in one general second aspect, the techniques disclosed here feature a method for operating a transmission protocol in a user terminal for uplink data packet transmission in a communication system. A transmission counter is configured for the transmission protocol of the user terminal for counting the number of transmissions the user terminal has performed for a data packet. The user terminal is configured with a first transmission counter parameter setting a maximum number of allowable transmissions of a data packet for the operation of the transmission counter. The user terminal is configured to participate in sidelink discovery operation with other user terminals based on sidelink discovery gaps configured for the user equipment. The user terminal cannot transmit and/or receive signals under control of the transmission protocol when participating in sidelink discovery operation during the sidelink discovery gaps. The method comprises incrementing by the user terminal the transmission counter for a data packet when a retransmission of the data packet is triggered by the transmission protocol. Then user terminal determines whether the triggered retransmission of the data packet was not performed because the transmission protocol operation collided with one of the sidelink discovery gaps. In case of collision, the user terminal uses for the operation of the transmission counter of the data packet a second transmission counter parameter so as to increase the maximum number of allowable transmissions of the data packet for the transmission counter.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIG. 12 shows an SL-GapRequest Information Element.

FIG. 13 shows a SidelinkUE Information Message.

FIG. 14 shows an SL-DiscConfig Information Element.

FIG. 15 shows an SL-GapConfig Information Element.

DETAILED DESCRIPTION

Figure 1:
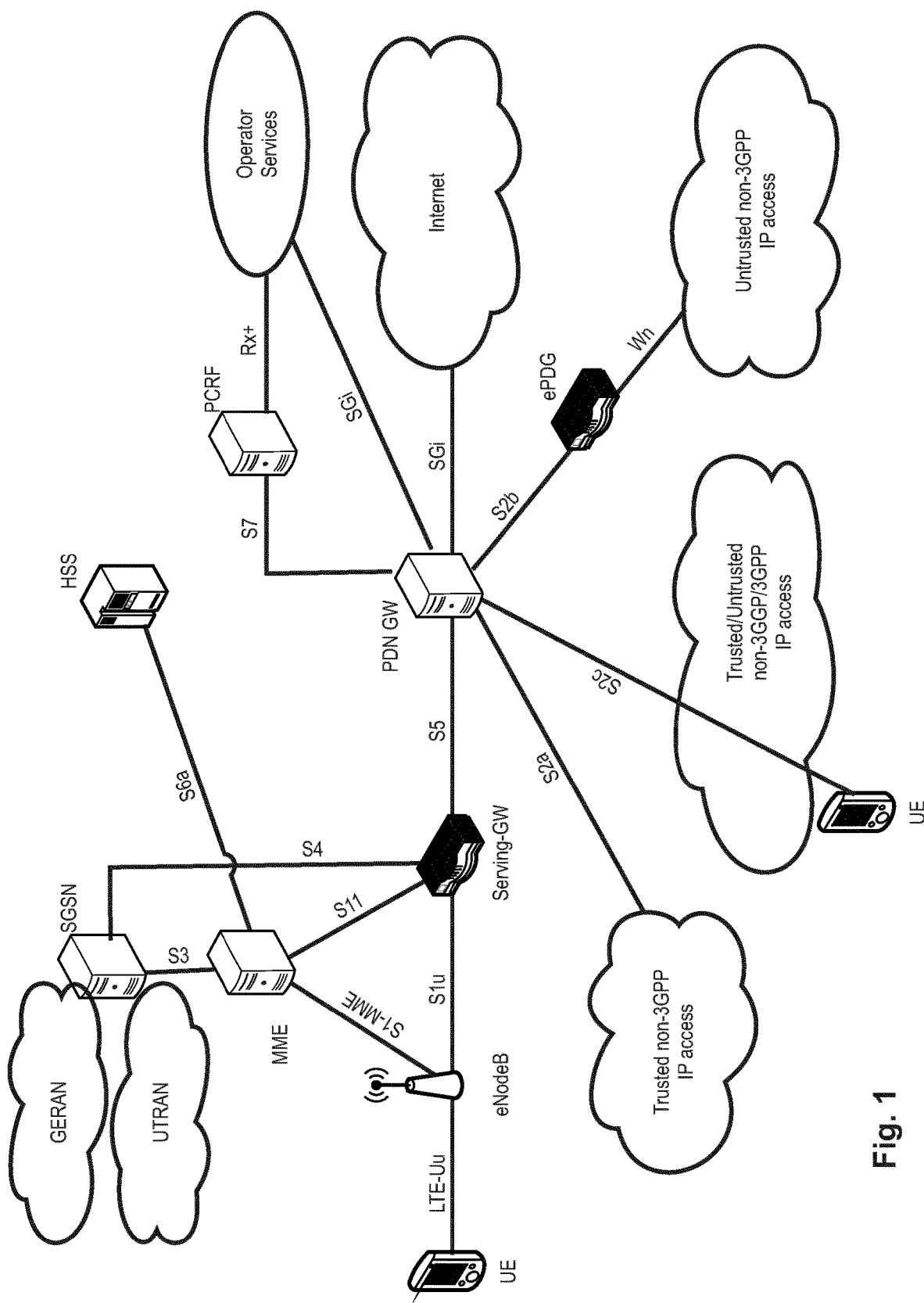
FIG. 1 shows an exemplary architecture of a 3GPP LTE system.
Figure 2:
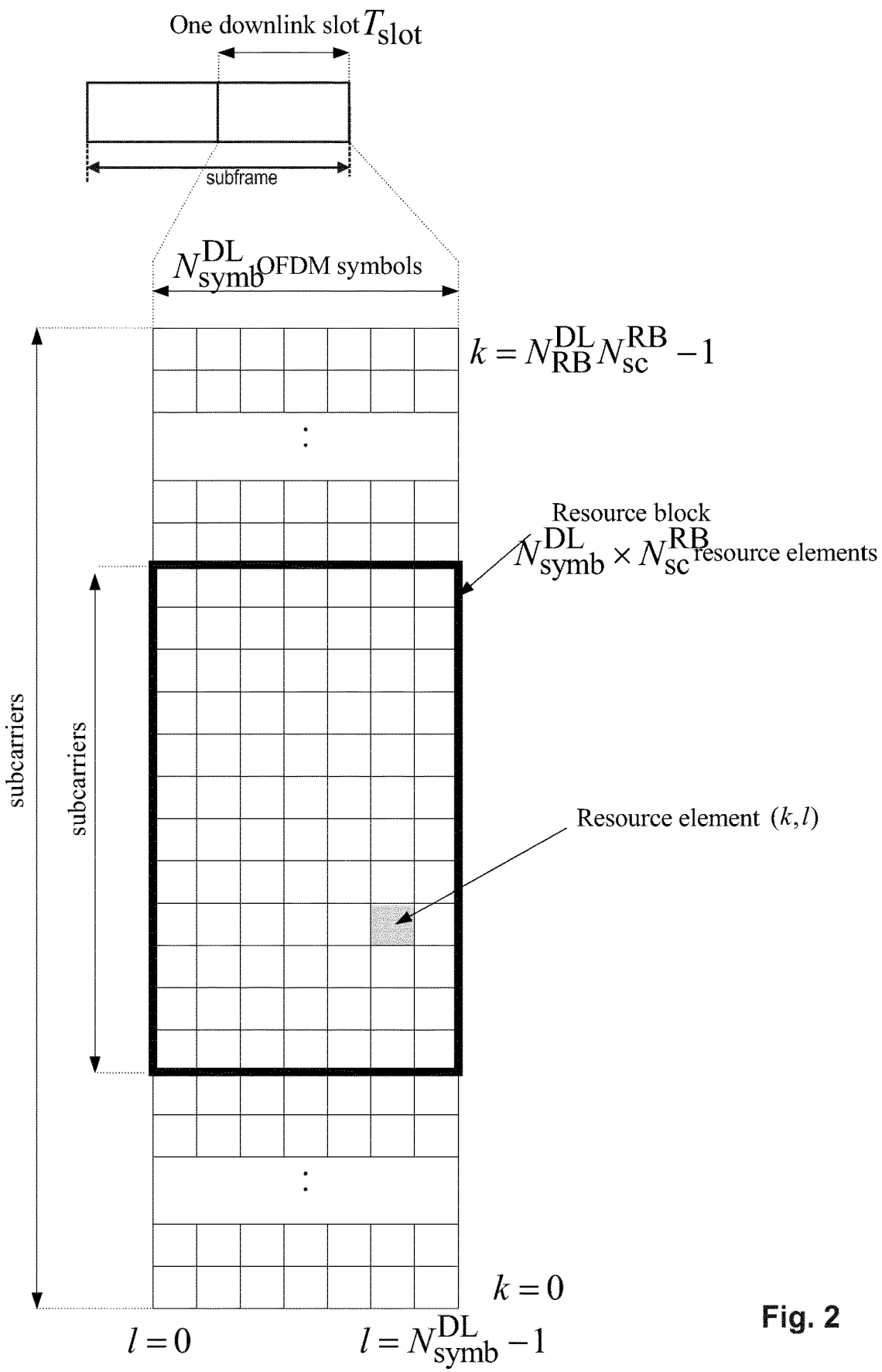
FIG. 2 shows an exemplary downlink resource grid of a downlink slot of a subframe as defined for 3GPP LTE (Release 8/9), FIG. 3 exemplary illustrates the transmission protocol operation between the UE and the eNodeB for an uplink transmission and its retransmissions, FIG. 4 schematically illustrates how to establish a layer-2 link over the PC5 for ProSe communication, FIG. 5 schematically illustrates the PC 5 interface for device-to-device direct discovery, FIG. 6 schematically illustrates a radio protocol stack for ProSe direct discovery.

A mobile station or mobile mode or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "direct communication transmission" as used in the set of claims and in the application is to be broadly understood as a transmission directly between two user equipments, i.e., not via the radio base station (e.g., eNB). Correspondingly, the direct communication transmission is performed over a "direct sidelink connection", which is the term used for a connection established directly between two user equipments. For example, in 3GPP the terminology of D2D (Device-to-Device) communication is used or ProSe communication, or a sidelink communication. The term "direct sidelink connection" as used in the set of claims and in the application is to be broadly understood and can be understood in the 3GPP context as the PC5 interface described in the background section.

The term "ProSe" or in its unabbreviated form. "Proximity Services", used in the application is applied in the context of Proximity-based applications and services in the LTE system as exemplarily explained in the background section. Other terminology such as "D2D" is also used in this context to refer to the Device-to-Device communication for the Proximity Services. Furthermore, in the claims the terminology of "sidelink logical channels" is used so as to be consistent with the overall terminology employed throughout the set of claims, such as "sidelink data", or "sidelink destination"; "sidelink logical channels" are those logical channels set up for proximity services/D2D.

The expression "participate in sidelink discovery" as used in the set of claims and in the application is to be broadly understood as comprising the procedure of a ProSe-enabled UE discovering other ProSe-enabled UEs (by e.g., the UE broadcasting discovery messages) and of a ProSe-enabled UE being discovered by other ProSe-enabled UEs (by e.g., listening for discovery messages).

As explained in the background section, the 3GPP standardization body decided to introduce sidelink discovery gaps to enhance inter-carrier discovery performance, differentiating between sidelink discovery gaps for reception and sidelink discovery gaps for transmission. During the time periods of these sidelink discovery gaps, uplink and downlink packet transmission operations are restricted in that no downlink channels can be received by the UE during the sidelink discovery gaps for reception, and in that the no uplink packet transmission can be performed during the sidelink discovery gap for transmission (e.g., assuming that the sidelink transmission gap is actually used in said respect by the UE).

Consequently, the uplink transmission operation towards the eNB on the Uu interface collides with the newly-introduced sidelink discovery gaps. This is exacerbated in view of that the minimum time period that is currently envisioned for a sidelink discovery gap is 40 ms long. The synchronous uplink HARQ operation has a round-trip-time of 8 ms, between subsequent (re)transmissions opportunities, such that a sidelink discovery gap of length 40 ms is relatively long in comparison, possibly blocking the uplink HARQ operation for at least up to five (re)transmission opportunities. This will be explained in more detail below.

The UE operates a (re)transmission protocol, e.g., HARQ, in order to control initial transmissions and retransmissions for a data packet (e.g., MAC PDU). Feedback (ACK/NACK) of the transmission protocol (and possibly a corresponding UL grant) is received by the UE in a synchronous manner, 4 ms after performing the uplink transmission. In turn, a further transmission of a new data packet (e.g., in case an uplink grant with a toggled New Data Indicator, for a new uplink transmission is received), or a retransmission of a previously received data packet (e.g., in case an uplink grant without a toggled New Data Indicator is received) can be performed 4 ms after receiving the HARQ feedback via the PHICH.

The legacy uplink transmission protocol operation on the Uu interface can collide with the sidelink discovery gaps in at least two ways. First, the UE cannot receive the HARQ feedback (i.e., PHICH) or the PDCCH (triggering an adaptive retransmission or a new initial transmission) during a sidelink discovery gap for reception, during which it needs to monitor for sidelink discovery messages of other UEs on a different carrier. When the HARQ buffer of the UE for a HARQ process is not empty (i.e., it still contains the previously-transmitted data packet), the UE will autonomously trigger a retransmission of said data in the HARQ buffer. This triggered retransmission however will only be instructed to the physical layer of the UE in case the UE received a NACK as the HARQ feedback for the data packet's previous initial transmission or retransmission from the eNodeB; i.e., in case the respective HARQ feedback is an ACK, the retransmission will not be performed. According to the currently defined standard TS 36.321, version 13.0.0, subclause 5.4.2.2, the UE will assume that the HARQ feedback, blocked by the reception sidelink discovery gap, was an ACK, thus putting the respective HARQ process in a suspension state (e.g., the associated HARQ buffer is not flushed). In consequence, though the UE will initially trigger a retransmission of the data packet due to the non-empty HARQ buffer (to be performed 4 ms later), the UE will however not execute the retransmission in view of the suspension state of the corresponding HARQ process (i.e., the feedback was an ACK, and not a NACK).

Secondly, the UE will not be able to execute a retransmission during a sidelink discovery gap for transmission, especially when this transmission sidelink discovery gap is indeed used by the UE for performing a transmission on the corresponding sidelink discovery channel, SL-DCH. As defined, the standard defines that any transmissions of sidelink discovery are prioritized over (re)transmissions in the uplink on the PUSCH. More specifically, according to the currently-defined standard TS 36.321, version 13.0.0, subclause 5.4.2.2, the HARQ protocol only then allows the HARQ entity to instruct the physical layer to create a transmission when no sidelink discovery gap for transmission is configured in this TTI or, if a sidelink discovery gap for transmission is configured in the TTI, when there is no configured grant for transmission on the sidelink discovery general in this TTI.

In summary, the operation of the transmission protocol and the provision of sidelink discovery gaps in the UE may collide in various subframes such that the UE will not be able to use various (re)transmission opportunities.

Nonetheless, the transmission protocol operation provides for a step of increasing the transmission counter of the data packet every time that a retransmission is triggered by the transmission protocol, irrespective of whether or not the retransmission is indeed performed or not. In particular, as apparent from clause 5.4.2.2 of the 3GPP standard TS 36.321, current version 13.0.0, the transmission counter, COUNTER_TX_NB, is increased in the first procedural step in case a retransmission is requested, although the actual generation of the transmission is still dependent on other circumstances, such as on the HARQ-feedback being a NACK or on the presence and usage of a sidelink discovery gap for transmission.

Correspondingly, the UE would increase the transmission counter associated with the data packet every time that a retransmission of the data packet is triggered by the transmission protocol even when the retransmission is then not performed because of the collision with the sidelink discovery gaps. The transmission counter may thus reach its limit, the maximum number of transmissions allowed for a data packet, such that the HARQ buffer will be flushed (i.e., emptied, content will be deleted), and a data packet is lost. Furthermore, the outer RLC ARQ procedure for RLC AM mode is responsible for recovering from such a data packet loss, and will thus be triggered subsequently e.g., by the receiving entity which identifies the missed data packet and then transmits an RLC status report accordingly.

Performing an RLC retransmission is quite costly in view of that first the retransmission of a data packet (which was not successfully received after the HARQ operation) needs to be detected and then requested by the means of an RLC status report. This will incur some additional delay. Furthermore, the UE needs to perform again the LCP procedure in order to form the MAC PDU containing the corresponding RLC PDUs which were not successfully transmitted.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiments.

Furthermore, as mentioned above, the following embodiments may be implemented in the 3GPP LTE-A (Rel.12/13) environment, but possibly also in future releases. The various embodiments mainly provide an improved uplink HARQ transmission protocol operation for ProSe-enabled UEs that also participate in the sidelink discovery procedures, and particularly the coordination of the sidelink discovery gaps with the operation of the (re)transmissions. Therefore, other functionality (i.e., functionality not changed by the various embodiments) may remain exactly the same as explained in the background section or may be changed without any consequences to the various embodiments. This includes other ProSe functionality such as the sidelink transmission procedures performed by the UE(s) to transmit or receive sidelink data via a sidelink connection, but also procedures to set up a UE to be ProSe enabled, including the configuration of the sidelink discovery gaps and how they are controlled by the UE. Furthermore, the transmission protocols of the UE, e.g., MAC HARQ and RLC ARQ, can be set up as usual, including the HARQ entity, HARQ processes and respective transmission counters, etc. as currently defined in the relevant standards, and exemplarily explained in the background section.

First Embodiment

In the following a first embodiment for solving the above-mentioned problem(s) will be described in detail. Different implementations and variants of the first embodiment will be explained as well.

Exemplarily, a user terminal is assumed that performs uplink data packet transmissions e.g., to its serving base station, over a carrier (e.g., the PCell) via the PUSCH. The UE will operate at least one (re)transmission protocol, e.g., the MAC HARQ protocol, to control the transmission and retransmission of MAC PDUs, also termed data packets or transport blocks. Corresponding HARQ entities and HARQ processes will be set up in the UE in a usual manner; for the embodiments described herein, the transmit HARQ entities and corresponding HARQ process are relevant. Transmissions and retransmission in the uplink will be under control of the HARQ transmission protocol of the UE. A transmission counter will be set up for each HARQ process so as to keep track of the number of transmissions a data packet served by said HARQ process was already transmitted. Optionally, the transmission counter can be used to flush the HARQ process buffer (and thus delete the data packet stored therein) in case the transmission counter reaches the maximum number of transmissions for a particular data packet. In general, the transmission protocol operation (e.g., when to perform an initial transmission of a data packet, when to perform a retransmission of a data packet) will be generally under control of the eNB, e.g., by transmitting to the UE the HARQ feedback via the PHICH and/or an uplink grant via the PDCCH for a new transmission or retransmission. According to a specific exemplary implementation of the first embodiment, the HARQ protocol as explained in the background section is used, following the standard TS 36.321, particularly clause 5.4.2 "HARQ operation" with particular changes thereto as will be explained in the following.

Optionally, the UE may operate a further (re)transmission protocol at a higher layer (e.g., the RLC) so as to further recover from errors occurring during the lower-layer MAC HARQ protocol operation, e.g., NACK-to-ACK errors or lost data packets. According to a specific exemplary implementation of the first embodiment, the RLC retransmission protocol operation as explained in the background section can be used.

Furthermore, for the exemplary scenario assumed, the user equipment is enabled to perform ProSe communication (ProSe-enabled UEs), i.e., D2D transmissions directly between UEs without the detour via the eNodeB via respective sidelink connections. ProSe communication also involves that ProSe-enabled UEs participate in sidelink discovery operations with other ProSe-enabled UEs, i.e., by exchanging predefined sidelink discovery signals so as to determine other ProSe-enabled UEs in its proximity and/or to be visible to other ProSe-enabled UEs. Different sidelink discovery models can be defined, such as the Model A ("I am here") or Model B ("Who is there?"/"Are you there?") explained in the background section. In any case, to remain general, in order to participate in sidelink discovery operations (irrespective of the particular discovery model used), the UE should be able to transmit sidelink discovery messages (e.g., to discover other ProSe-enabled UEs) over the sidelink channel and should be able to monitor the sidelink channel for and receive sidelink discovery messages transmitted from other UEs (e.g., to be discovered by other ProSe-enabled UEs).

Furthermore, it is exemplarily assumed that inter-carrier ProSe operation is supported such that the sidelink direct discovery is operated on another cell than the cell used for performing the uplink transmissions via the PUSCH (e.g., PCell). For instance, the UE is configured to perform sidelink discovery operation in a non-serving carrier and/or secondary cell and thus has to support enhanced direct discovery for ProSe.

To assist in the enhanced sidelink discovery, it is assumed that the UE is further configured with sidelink discovery gaps, a sidelink discovery gap for reception and/or a sidelink discovery gap for transmission. In the following it is assumed for illustration purposes only, that the UE is configured with both a sidelink discovery gap for transmission and reception, although the first embodiment is equally applicable to scenarios where the UE is configured with only one of the sidelink discovery gaps. As exemplarily explained in the background section, the transmit/receive operation of the UE is restricted during the sidelink discovery gaps. Particularly, during a reception sidelink discovery gap the UE will not be able to receive downlink channels (except during random access procedure, which however is not relevant for the functioning of the embodiments and thus will be ignored in the following). On the other hand, during a transmission sidelink discovery gap the UE will prioritize any sidelink discovery transmission over another "usual" uplink (re)transmission on PUSCH, i.e., the UE will not be able to perform a HARQ (re)transmission during a transmission sidelink discovery gap when it already performs a sidelink discovery message transmission or when retuning its RF unit. However, should the UE not perform a sidelink discovery transmission during a transmission sidelink discovery gap, then, the UE transmission protocol operation is not blocked such that the UE could indeed perform a HARQ (re)transmission in the uplink.

According to the first embodiment, the coordination of the HARQ protocol operation with the sidelink discovery operation using the sidelink discovery gaps is optimized as will be explained in the following. The first embodiment provides a UE which shall be able to determine when a triggered retransmission is not performed because of the parallel operation of the sidelink discovery and its sidelink discovery gaps. When the UE determines that such a collision occurred, i.e., that a triggered retransmission is not performed because of the parallel operation of the sidelink discovery and its sidelink discovery gaps, the UE shall operate the respective HARQ transmission counter of the data packet such that the triggered but "blocked" retransmission does not result in an increment of the HARQ transmission counter. Put differently, even though the retransmission was triggered by the HARQ protocol, it shall not count as a further (re)transmission of the data packet (i.e., the transmission counter shall not be incremented in said respect).

More specific variants of the first embodiment will be described in the following. Collisions between the HARQ operation and the sidelink discovery operation based on sidelink discovery gaps can have various reasons. The UE shall thus detected these different collisions, as will be explained in the following distinguishing between transmission sidelink discovery gaps and reception sidelink discovery gaps that each may separately be the source of the collision with the HARQ retransmission of data.

During a reception sidelink discovery gap the UE is blocked from receiving other downlink channels, which includes the reception of the HARQ feedback via the PHICH for previously transmitted data packets or the PDCCH containing the DCI for scheduling uplink retransmissions, e.g., adaptive retransmissions. However, the HARQ feedback is normally used by the eNB to instruct the UE to perform a non-adaptive retransmission, in case the received data e.g., could not be successfully decoded in the eNodeB. For example, sending a NACK as the HARQ feedback will result in that the transmission protocol performs a retransmission, more specifically a non-adaptive retransmission. Consequently, by not being able to receive the HARQ feedback during reception sidelink discovery gaps, the HARQ operation will be blocked such that the UE will not perform a corresponding uplink retransmission. The UE shall thus monitor for and identify such a collision. The same applies for the reception of a PDCCH instructing the UE to perform an adaptive retransmission.

During a transmission sidelink discovery gap, sidelink discovery transmissions are prioritized over transmissions in the uplink such that the UE may be blocked from actually carrying out a transmission in the uplink, which includes any transmission or retransmission performed according to the HARQ protocol. Put differently when the UE is going to perform in a subframe a sidelink discovery message transmission, it will not be able to perform a HARQ retransmission at the same time. Therefore, even if the retransmission is triggered in the HARQ protocol (e.g., by receiving an explicit uplink grant requesting the retransmission), the UE will not carry same out due to being blocked by the corresponding sidelink discovery operation during the transmission sidelink discovery gap. The UE shall thus monitor for and identify such a collision.

Two different types of collisions are explained above, and the UE shall monitor for both and then control the transmission counter accordingly. In particular, the transmission counter shall not be increased as a result of such a collision, even though the retransmission was initially triggered in the HARQ protocol (i.e., instructed by the eNB).

In order to ensure that the transmission counter of the respective data packet is not increased by the blocked retransmission, the following two exemplary implementations can be provided.

According to the currently pending standard, the HARQ protocol operation provided for a step of incrementing the HARQ transmission counter for a data packet every time the retransmission is triggered for that data packet. According to one option of the first embodiment, this step of increasing the transmission counter is further made dependent on whether a collision was detected. Consequently, if a collision of a triggered retransmission with a sidelink discovery gap (for transmission or reception) was detected by the UE, the step of incrementing the transmission counter will not be performed.

Figure 8:
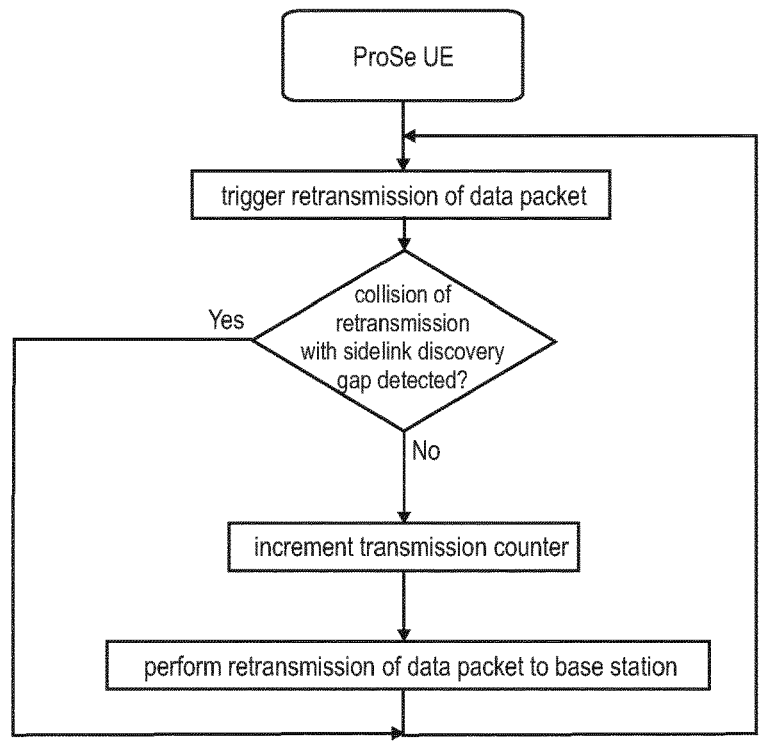
FIG. 8 illustrates an exemplary sequence diagram for the UE operation according to one possible implementation of the first embodiment.

FIG. 8 exemplarily illustrates a possible sequence diagram for the ProSe operation the user terminal according to an implementation for this option of the first embodiment. As apparent therefrom, the step of incrementing the transmission counter, after the corresponding transmission of the data packet, is directly dependent on whether a collision of the triggered retransmission with the sidelink discovery gaps is detected. In case no collision is detected, the transmission counter can be incremented and the corresponding transmission can be performed. The order of the steps of incrementing the transmission counter and of performing the retransmission can be changed, or the steps can be performed in parallel.

In an exemplary implementation according to the LTE standard as explained in the background section, this first option could be implemented as following. For instance, an additional note may be provided clarifying that when no UL-SCH transmission can be made due to the occurrence of a Sidelink Discovery Gap for transmission and/or reception, CURRENT_TX_NB is not increased. Such a Note could be for example added in section 5.4.2.2 of TS36.321.

According to another option of the first embodiment, instead of adapting the step of incrementing the transmission counter as for the first option, this second option is based on introducing an additional step so as to decrement the transmission counter for the data packet, in case a collision is detected. Consequently, even though the triggering of the retransmission increments the transmission counter, by providing the additional step of decrementing the transmission counter for the data packet in case of collision, the blocked retransmission will at the end not result in an incremented transmission counter and will thus not count as a transmission of the data packet.

Figure 9:
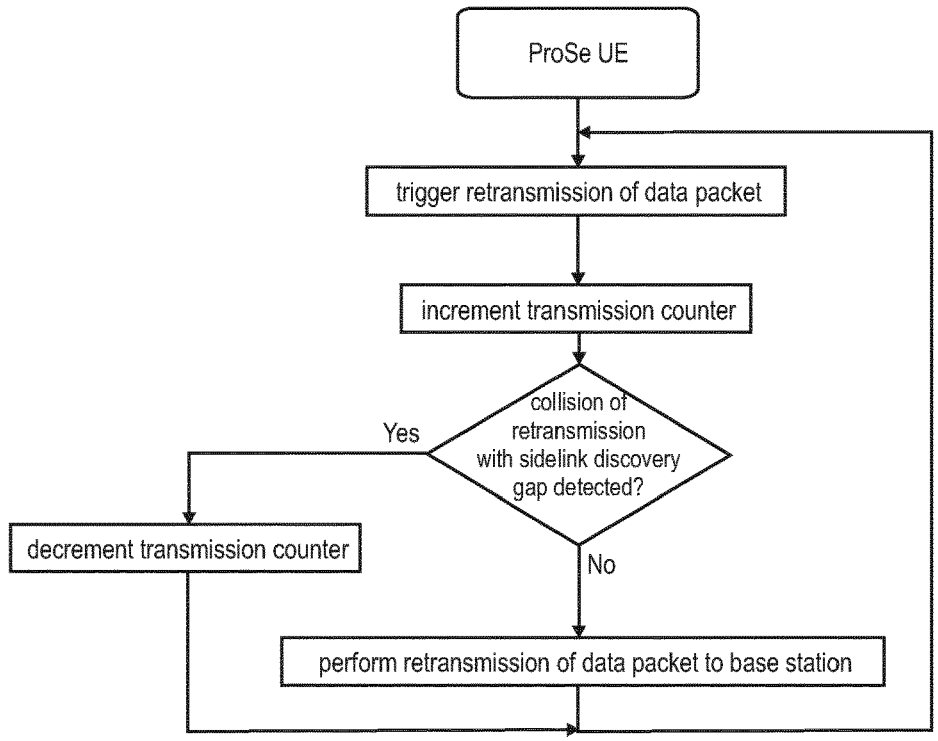
FIG. 9 illustrates an exemplary sequence diagram for the UE operation according to another possible implementation of the first embodiment.

FIG. 9 exemplarily illustrates a possible sequence diagram for the ProSe operation the user terminal according to an implementation for this second option of the first embodiment. The difference to the first option, as illustrated in FIG. 8, should be readily apparent. The step of incrementing the transmission counter is performed upon triggering the retransmission of the data packet, and is thus independent of whether or not a collision of the retransmission with sidelink discovery gaps is detected or not. On the other hand, in case such a collision is detected, the transmission counter is decremented.

In an exemplary implementation according to the LTE standard as explained in the background section, this second option could be implemented by adding the following underlined lines to the respective HARQ operation in section 5.4.2.2 of TS 36.321:

After performing above actions, the HARQ process then shall:
    if no retransmission on UL-SCH can be made due to the occurrence of a sidelink discovery gap for transmission or reception
        CURRENT_TX_NB=CURRENT_TX_NB−1
    if CURRENT_TX_NB=maximum number of transmissions−1:
        flush the HARQ buffer;

As a result, since the UE considers the collisions of triggered retransmissions for operating the transmission counter as explained above, a blocked retransmission will no longer result in an incremented transmission counter. Consequently, the UE will not lose the corresponding opportunities to perform a retransmission and thus possibly allows the receiving side to successfully decode the data packet. Data packet loss, incurred by the configured sidelink discovery gaps, can thus be mitigated, and corresponding error correction using the outer RLC ARQ does not become necessary.

According to the first embodiment, also the eNodeB shall be adapted in a corresponding manner as just explained for the Prose enabled UE. The eNodeB, as the recipient of the data transmissions under control of the transmission protocol in the UE and as the entity responsible for scheduling the UE, shall also keep track of the transmission protocol operation in the same manner as the UE. Consequently, the eNodeB shall also monitor for possible collisions of the UE transmission protocol operation with the sidelink discovery operation and shall thus operate the transmission counter within the eNodeB such that the transmission counter will not be incremented by such a blocked data packet retransmission by the UE. This involves that the eNodeB shall monitor the same types of collisions that have been explained above for the UE. Consequently, the transmission counter in the UE and the corresponding transmission counter in the eNB for the same data packet, shall be synchronized.

According to further implementations of the first embodiment, coordination of the uplink HARQ protocol operation during measurement gaps is explained. As explained in the background section, the UE is able to perform particular measurements (e.g., mobility measurement) during measurement gaps with which the UE is configured by the eNodeB. In a similar manner as with the sidelink discovery gaps, the uplink HARQ transmit protocol operation is restricted by these measurement gaps in that the UE will not be able to receive downlink channels from the eNodeB during measurement gaps and will not be able to perform uplink transmissions to the eNodeB during measurement gaps. For instance, according to the currently defined HARQ protocol operation of the standard TS 36.321, the UE considers to have received an ACK, in case an expected HARQ feedback via the PHICH could not be received due to a collision with a measurement gap.

In contrast to the coordination of the HARQ protocol operation with the sidelink discovery gaps however, the UE will increase the transmission counter for a data packet whenever the retransmission for that data packet is triggered by the HARQ protocol, irrespective of whether or not the retransmission is actually blocked or not by the measurement gap. Consequently, a triggered retransmission of a data packet which is then however blocked by a measurement gap will thus increment transmission counter in contrast to triggered retransmissions blocked by sidelink discovery gaps. This simplifies the operation of the HARQ protocol with regard to measurement gaps, which are significantly shorter in time length than sidelink discovery gaps. Since a measurements gap is only blocking one HARQ (re)transmission opportunity of a HARQ process, i.e., measurement gap spans over 7 ms whereas the HARQ RUT 8 ms is. Therefore, loosing this one HARQ transmission opportunity in light of a simple HARQ protocol operation, i.e., no need to detect collision of a UL HARQ transmission and a measurement gap in UE and eNB side, is acceptable.

Second Embodiment

In the following a second embodiment is presented which deals with the same problem as the one solved by the first embodiment, i.e., the one explained at the beginning of the detailed description.

The same assumptions as made for the first embodiment can be made for the second embodiment too. In brief, the UE is assumed to operate the MAC HARQ protocol with corresponding HARQ entities and HARQ processes, thereby controlling the transmission and retransmission of MAC PDUs, also termed data packets or transport blocks. A transmission counter will be set up for each uplink HARQ process, and the UE will be configured with a maximum counter value which indicates the maximum number of allowable transmissions of a data packet served by this transmission counter and HARQ process. Upon reaching this maximum number of allowable transmissions in the transmission counter, the corresponding buffer of the HARQ process will be flushed. Feedback for the uplink HARQ protocol operation will be received by the UE via the PHICH and/or an uplink grant will be received via the PDCCH. Again, a specific exemplary implementation of the second embodiment may be based on the HARQ protocol as explained in the background section, following the standard TS 36.321, particularly clause 5.4.2 "HARQ operation" with particular changes thereto as will be explained in the following. In said case, the parameter maxHARQ-Tx indicates the maximum number of allowable transmissions for a data packet to be used in connection with the transmission counter(s).

Optionally, the UE may operate a further (re)transmission protocol at a higher layer (e.g., the RLC) so as to further recover from errors occurring during the lower-layer MAC HARQ protocol operation, e.g., NACK-to-ACK errors or lost data packets. According to a specific exemplary implementation of the second embodiment, the RLC retransmission protocol operation as explained in the background section can be used.

Furthermore, it is assumed that the UE is ProSe enabled and thus participates in sidelink discovery operations with other ProSe-enabled user terminals, by exchanging predefined sidelink discovery signals. It is further exemplary assumed that inter-carrier ProSe operation is supported and assisted by configuring sidelink discovery gaps, a sidelink discovery gap for reception and/or a sidelink discovery gap for transmission as already explained in detail for the first embodiment. In brief, sidelink discovery gaps will restrict the transmit/receive operations of the UE.

The optimized coordination of the HARQ protocol operation with the sidelink discovery operation according to the second embodiment will now be explained based on the above exemplary assumptions. As currently specified in the standard, the step provided in the HARQ protocol so as to increment the transmission counter for a data packet every time a retransmission for that data packet is triggered is indeed performed, irrespective of whether the retransmission is then actually carried out or blocked by the sidelink discovery operation. As in the multiple variants of the first embodiment, the UE shall be able to determine when a collision between the HARQ protocol operation and the sidelink discovery operation occurs, i.e., it shall determine when a triggered retransmission is not performed because of the parallel operation of the sidelink discovery and the corresponding sidelink discovery gaps.

In case such collisions are detected by the UE, the HARQ protocol operation according to the second embodiment provides a further step so as to use an increased maximum number of allowable transmissions for operating the corresponding transmission counter of that data packet which retransmission collided with the sidelink discovery operation. The increase in the maximum number of allowable transmissions thus compensates for the increment of the transmission counter by the triggered, but blocked, retransmission of the data packet.

Figure 10:
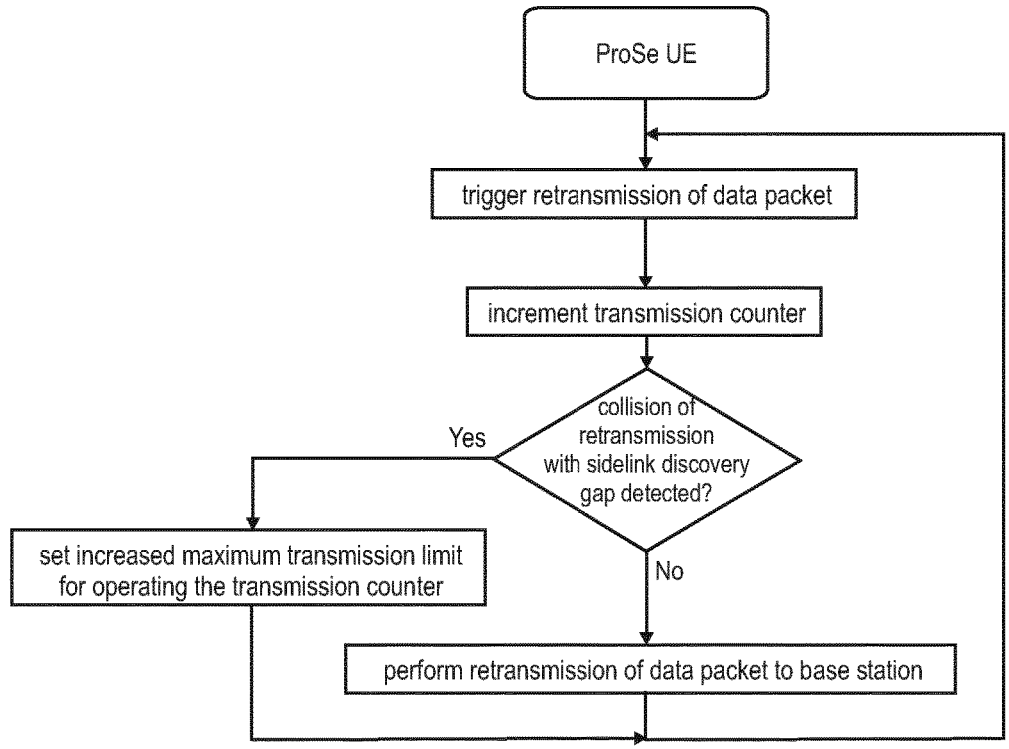
FIG. 10 illustrates an exemplary sequence diagram for the UE operation according to an implementation of the second embodiment.

FIG. 10 exemplarily illustrates a sequence diagram for the UE operation according to the second embodiment. As apparent therefrom, the transmission counter is incremented upon triggering the retransmission of the data packet. On the other hand, in case a collision is detected, the value of the maximum number of allowable transmissions (i.e., the maximum transmission limit) is increased and applied to the subsequent operation of the transmission counter.

More specific variants of the second embodiment will be described in the following. As already explained in connection with the first embodiment, collisions between the HARQ operation and the sidelink discovery operation can occur for at least two different reasons which the UE has to be able to monitor and detect.

In brief, during a reception sidelink discovery gap the UE is blocked from receiving other downlink channels, which includes the reception of the HARQ feedback via the PHICH for previously transmitted data packets and/or the PDCCH containing the DCI for scheduling uplink retransmissions, e.g., adaptive retransmissions. Consequently, by not being able to receive the HARQ feedback during reception sidelink discovery gaps, the HARQ operation will be blocked such that the UE will not perform a corresponding uplink retransmission. The UE shall thus monitor for and identify such a collision. During a transmission sidelink discovery gap, sidelink discovery transmissions are prioritized over transmissions in the uplink such that the UE may be blocked from actually carrying out a transmission in the uplink, such as any transmission or retransmission performed according to the HARQ protocol. The UE shall thus monitor for and identify such a collision.

There are different exemplary implementations of the second embodiment so as to increase, in case of detecting a collision, the maximum number of allowable transmissions of a data packet that is applied to the operation of a particular transmission counter.

Figure 3:
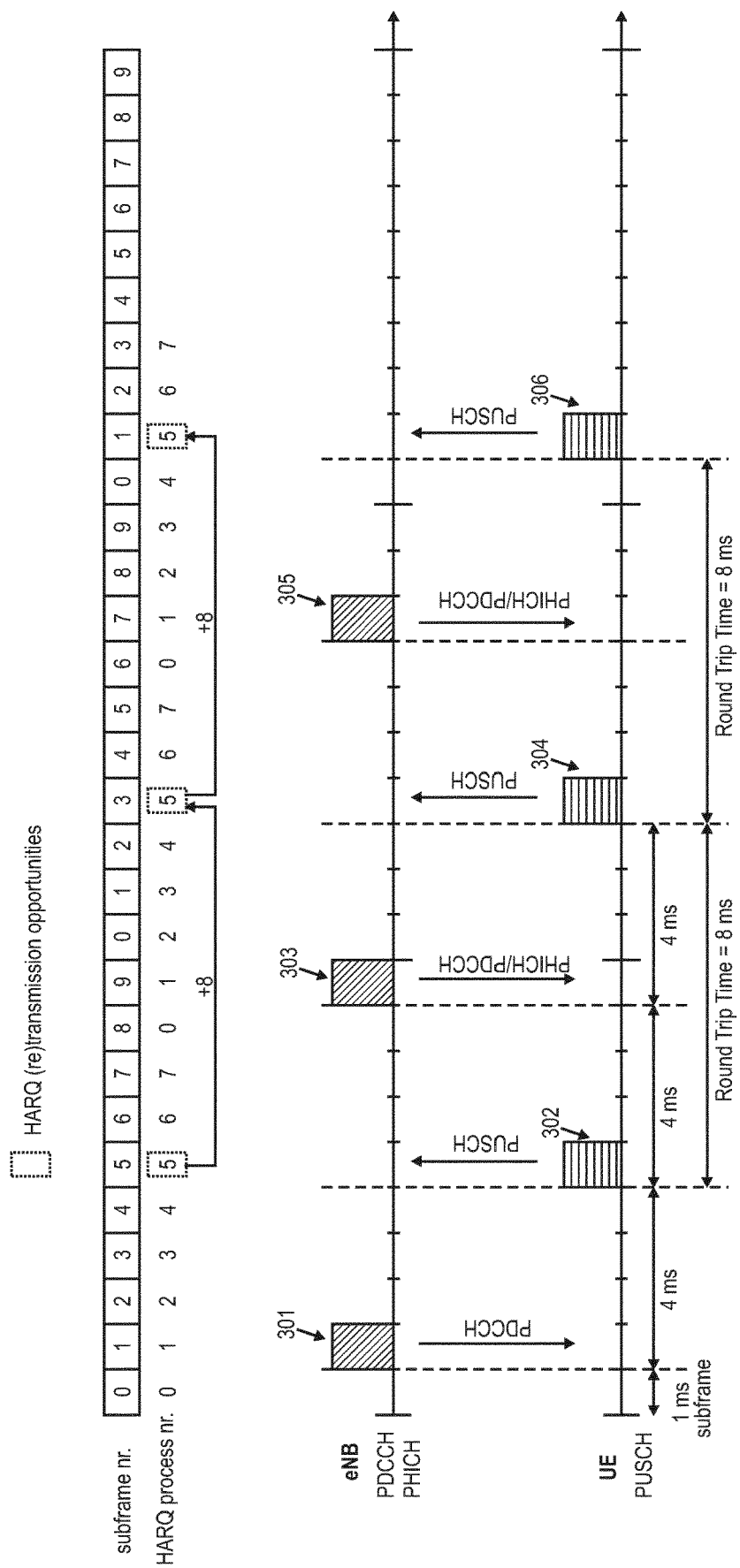
Figure 4:
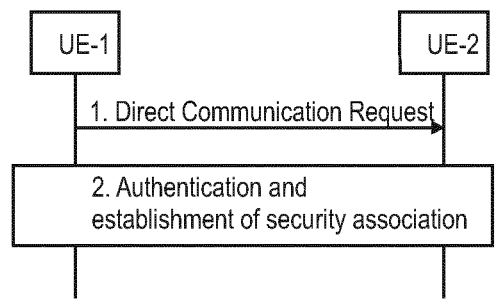
Figure 5:
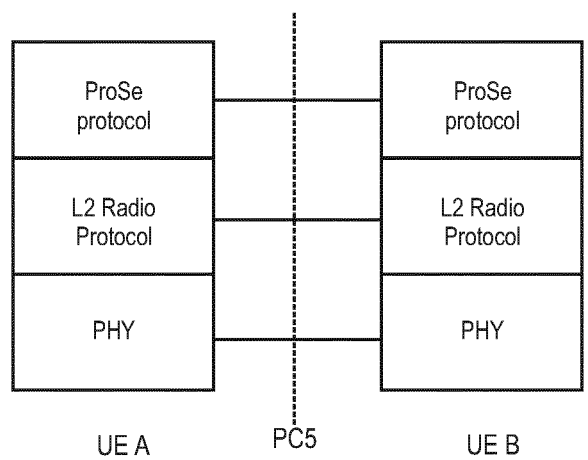
Figure 6:
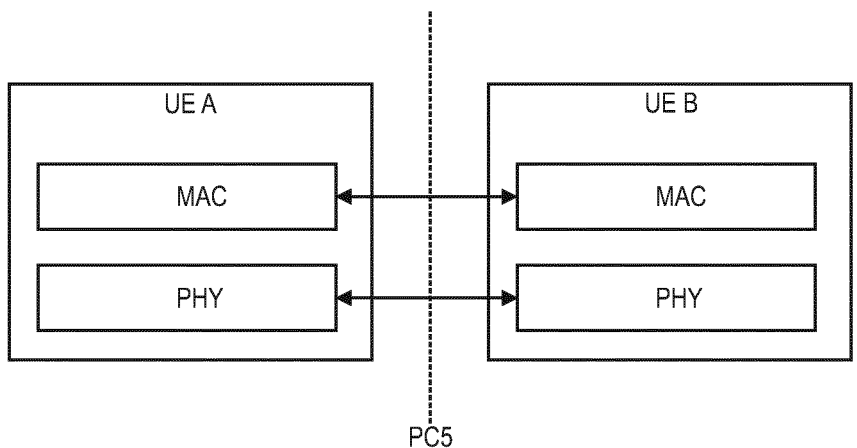
Figure 7:
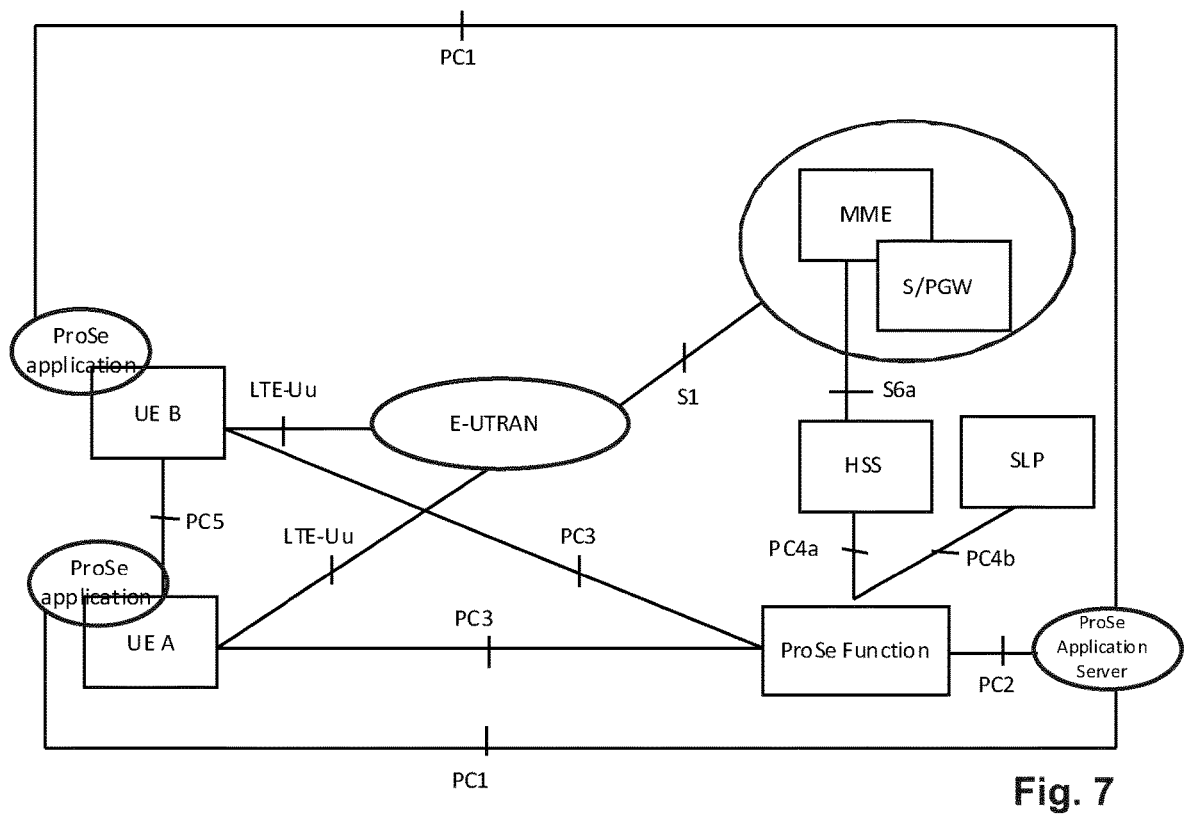
FIG. 7 illustrates an exemplary architecture model for ProSe for a non-roaming scenario.

According to one option, a new parameter for the maximum number of allowable transmissions is used and configured for the UE (e.g., by the eNodeB). This new parameter, exemplarily termed maxHARQ-TxSLgap, is additionally introduced so as to be applicable in situations where a transmission counter is incremented by a triggered retransmission which is however later then blocked by the sidelink discovery operated at the same time by the UE. The eNodeB might be responsible for setting and configuring this additional collision-specific transmission counter parameter and might send it to the UE e.g., when setting up the HARQ protocol operation; e.g., at the same time as providing the initially used parameter, maxHARQ-Tx, for the operation of the transmission counter(s). Correspondingly, the value of the new parameter, maxHARQ-TXS-Lgap, can be configured to be higher than the corresponding value of the usual parameter maxHARQ-Tx, with which the UE initially operates the transmission counter(s). In said respect, it should be noted that the eNodeB is aware of both the usual parameter as well as the length of the sidelink gaps which will be used by the UE to perform sidelink discovery. Correspondingly the eNodeB will be aware of the number of retransmission opportunities available to the UE that could be blocked by the sidelink discovery operation during those sidelink discovery gaps; e.g., for a sidelink discovery gap of 40 ms and assuming retransmission opportunities occurring every 8 ms (see FIG. 3), up to five retransmission opportunities could be blocked. The eNodeB might thus use for the new, collision-specific, parameter, maxHARQ-TXSLgap, a value which is correspondingly increased (e.g., by five) compared to the value of the other transmission counter parameter, maxHARQ-Tx.

Figure 11:
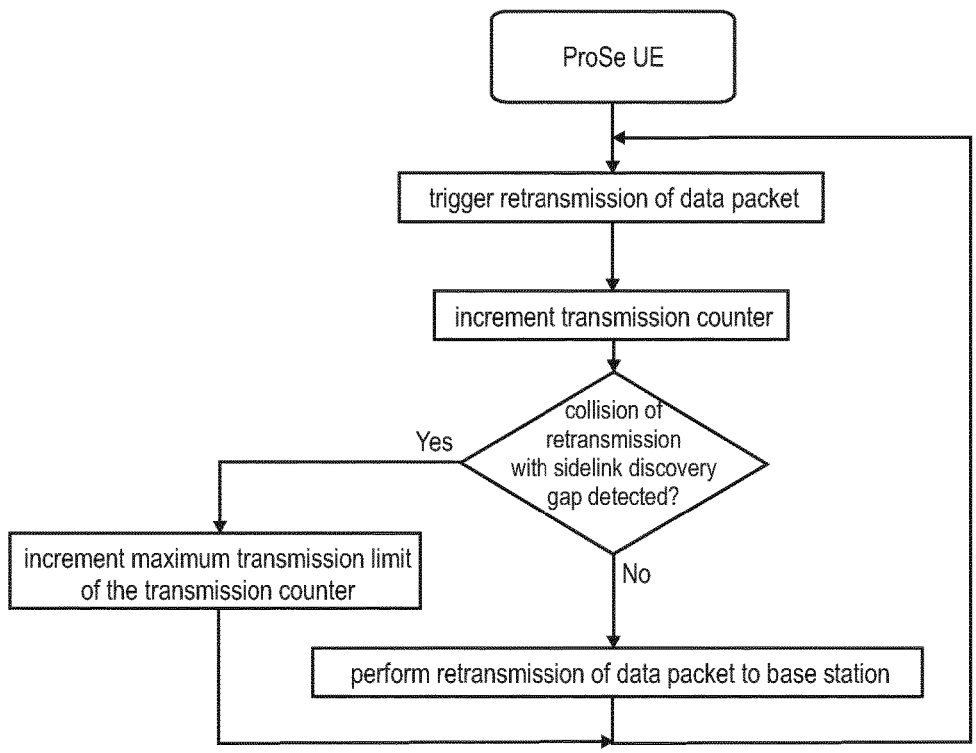
FIG. 11 illustrates an exemplary sequence diagram for the UE operation according to a possible implementation of the second embodiment.

According to another option, instead of using an additional, collision-specific, parameter, the UE can change the maximum number of allowable transmissions applied to the transmission counter on its own, in case of collision. For example, when the UE detects a collision occurring for a triggered retransmission, it will also increment the maximum number of allowable transmissions applicable for the corresponding transmission counter (which was previously incremented due to the triggered retransmission). FIG. 11 exemplarily illustrates the UE operation according to this option for the second embodiment. As apparent from FIG. 11, upon detecting a collision, the UE operation increments the maximum transmission limit of the transmission counter, i.e., increments the previously configured maximum number of allowable transmissions for operating the transmission counter.

In any case, the maximum number of allowable transmissions for a transmission counter, which was incremented by a triggered data packet retransmission which was later actually not performed because it collided with a sidelink discovery gap, is increased, thereby avoiding that the HARQ buffer is flushed due to those colliding data packet retransmissions. The UE will thus have more retransmission opportunities, after the sidelink discovery gaps, so as to successfully transmit the data packet to the receiving entity i.e., the eNodeB.

The second embodiment also provides an eNodeB that is adapted in a corresponding manner as explained above for the UE. The eNodeB, as the recipient of the data transmissions under control of the transmission protocol in the UE and as the entity responsible for scheduling transmissions and/or retransmissions for the UE, should also operate the relevant part of the transmission protocol in the corresponding manner as the UE. Consequently, the eNodeB should also monitor for possible collisions of the UE transmission protocol operation with the UE sidelink discovery operation. It shall thus also increase the maximum number of allowable transmissions for the corresponding transmission counter as done in the UE. Therefore, the transmission counter in the UE and the corresponding transmission counter in the eNodeB for the same data packet will be operated in the same manner.

As already explained in connection with the first embodiment, further implementations of the second embodiment may also involve the coordination of the uplink HARQ protocol operation during measurement gaps. In brief, measurement gaps are used by the UE to perform particular measurements such that the uplink HARQ transmit protocol operation is restricted. For instance, the UE will not be able to receive downlink channels from the eNodeB during measurement gaps such as the HARQ feedback, and the UE will not be able to perform uplink transmissions to the eNodeB during measurement gaps.

In contrast to the coordination of the HARQ protocol operation with the sidelink discovery gaps according to the above explained second embodiment, the UE will increase the transmission counter for a data packet whenever the retransmission for that data packet is triggered by the HARQ protocol and will continue using the initially configured maximum number of allowable transmissions for operating the transmission counter, irrespective of whether or not a collision of the triggered retransmission with a measurement gap occurred.

Consequently, a triggered retransmission of a data packet which is then however blocked by a measurement gap will thus not change the operation of the transmission counter in contrast to triggered retransmissions blocked by sidelink discovery gaps. As explained above this simplifies the HARQ protocol operation with regard to measurement gaps, which are significantly shorter in time length than sidelink discovery gaps.

Third Embodiment

In the following a third embodiment is presented which deals also with the same problems solved by the first and second embodiments. The same assumptions as made for the first and second embodiments can be made for the third embodiment as well. In brief, the UE is assumed to operate the MAC uplink HARQ protocol with corresponding HARQ entities and HARQ processes, thereby controlling the transmission and retransmission of MAC PDUs, also termed data packets or transport blocks. A transmission counter will be set up for each HARQ process and will be particularly used for flushing the buffer associated with the HARQ process for a data packet in case the counter reaches a maximum number of allowable transmissions. Feedback for the HARQ protocol operation will be received by the UE via the PHICH and/or an uplink grant via the PDCCH. Again, a specific exemplary implementation of the second aspect may be based on the MAC HARQ protocol as explained in the background section, following the standard TS 36.321, particularly clause 5.4.2 "HARQ operation" further adapted as explained in the following.

The third embodiment further assumes that the UE operates another (re)transmission protocol at a higher layer (e.g., the RLC) so as to further recover from errors occurring during the lower-layer MAC HARQ protocol operation, e.g., NACK-to-ACK errors or lost data packets. According to a specific exemplary implementation of the third embodiment, the RLC retransmission protocol operation as explained in the background section can be used.

Furthermore, it is assumed that the UE is ProSe enabled and thus participates in sidelink discovery operations with other ProSe-enabled user terminals, by exchanging predefined sidelink discovery signals. It is further exemplary assumed that inter-carrier ProSe operation is supported and assisted by configuring sidelink discovery gaps, a sidelink discovery gap for reception and/or a sidelink discovery gap for transmission as already explained in detail for the first embodiment. In brief, sidelink discovery gaps will restrict the transmit/receive operations of the UE.

This third embodiment is different from the first and second embodiments, in that it does not only optimizes the MAC HARQ protocol operation but rather optimizes the coordination of the RLC transmission protocol operation, the MAC HARQ protocol operation and the sidelink discovery operation. As already explained for the first and second embodiments, the UE shall be able to detect collisions between the MAC HARQ protocol operation and the sidelink discovery operation, i.e., it shall determine when a triggered HARQ retransmission is not performed because of the parallel operation of the sidelink discovery and its sidelink discovery gaps. According to the MAC HARQ protocol operation, the UE will increment the transmission counter for a data packet every time that a retransmission for that data packet is triggered by the HARQ protocol, irrespective of whether the retransmission is then actually carried out or blocked by the sidelink discovery operation.

According to the third embodiment, a new trigger will be set up for triggering an RLC retransmission for a data packet which is lost due to the collision with the sidelink discovery operation in the UE; more specifically, the trigger will depend on whether the HARQ buffer, containing the data packet, was flushed because the HARQ transmission counter reached its limit (i.e., the maximum number of allowable transmissions) after having been incremented by a triggered retransmission which was not performed due to a collision with a sidelink discovery gap. The MAC layer will in such a case trigger the corresponding RLC entity(ies) to schedule a retransmission of an RLC PDU which was contained in the MAC PDU having been flushed from the HARQ transmission buffer. Hence, a new MAC/RLC interaction will be introduced by this new third embodiment.

Correspondingly, the outer RLC transmission protocol is responsible for retransmitting a lost data packet, respectively RLC PDU. As explained in the background section, usually an RLC retransmission is triggered in the transmitter when receiving a corresponding RLC status report from the receiving entity, which in turn might have detected a lost data packet based on a missing sequence number.

According to the third embodiment, a new trigger for an RLC retransmission is defined which avoids e.g., the need of the receiving entity to first detect the lost data packet and to thus request, via a corresponding RLC status report, its retransmission from the corresponding RLC AM transmitting entity in the UE. This new trigger is occurring at the transmitting side, i.e., to be more precise, the MAC entity will trigger the corresponding RLC transmitting entities to perform the corresponding RLC retransmission.

This new trigger may be implemented in different manners. For instance, the UE may keep track as to whether, and possibly how many times, a transmission counter was incremented because of a triggered retransmission that was actually not performed because it collided with a sidelink discovery gap. Then, if such a transmission counter reaches its maximum number of allowable transmissions, thus resulting in the flushing of the corresponding HARQ buffer, the corresponding RLC retransmissions are triggered. In one variant, a single collision-specific increment of the transmission counter is enough, and in another variant, a threshold-based approach can be envisioned, where a corresponding threshold is configured, e.g., 3, and the UE counts (e.g., by a suitable counter) the number of times the transmission counter was incremented due to such a triggered, but blocked, retransmission. Then, an RLC retransmission of an RLC PDU contained in the data packet is only then triggered, when the corresponding transmission counter reaches its maximum number of allowable retransmissions and thus flushes the corresponding HARQ buffer, and when the number of increments due to such a triggered, but blocked, retransmission is larger than (or equal to) the collision threshold previously set up in said respect.

According to a different simpler implementation, the RLC retransmission for an RLC PDU contained in a data packet (MAC PDU) is triggered when the last increment of the transmission counter upon which the HARQ buffer is flushed is caused by a triggered retransmission, which is then actually blocked by colliding with the corresponding sidelink discovery operation during a sidelink discovery gap.

According to a specific implementation of the third embodiment which is based on the current LTE standardization, particularly on the current standard TS 36.322, current version 13.0.0, the description of the new trigger for an RLC PDU retransmissions can be added in section 5.2.1. Correspondingly, the new trigger could be included in section 5.4.2.2 of TS 36.321, which specifies the HARQ protocol operation for an HARQ process. Here it will be specified that upon flushing of the HARQ buffer under the above mentioned additional conditions, the UE will inform the corresponding RLC entities to perform a retransmission of the corresponding RLC PDUs contained in the MAC PDU in this HARQ process.

As already explained in connection with the first and second embodiment, implementations of the third embodiment may also involve the coordination of the uplink HARQ protocol operation during measurement gaps.

In contrast to providing additional triggers for performing an RLC retransmission according to the above explained third embodiment, no such new trigger will be foreseen in connection with collisions of triggered retransmissions with measurement gaps. Therefore, in case the HARQ buffer is flushed because the transmission counter reaches its maximum transmission limit after having been incremented by triggered retransmissions that were then blocked by a measurement gap, this will not trigger a corresponding RLC retransmission, unlike when the transmission counter has been incremented by triggered retransmissions that were blocked by sidelink discovery gaps.

Further Embodiments

According to a first aspect, a transmitting user terminal is provided for operating a transmission protocol for uplink data packet transmission in a communication system. A transmission counter is configured for the transmission protocol of the user terminal for counting the number of transmissions the user terminal has performed for a data packet. The user terminal is configured to participate in sidelink discovery operation with other user terminals based on sidelink discovery gaps configured for the user equipment. The user terminal cannot transmit and/or receive signals under control of the transmission protocol when participating in sidelink discovery operation during the sidelink discovery gaps. The user terminal comprises a processor that determines whether a retransmission of a data packet, which is triggered by the transmission protocol, was not performed because the transmission protocol operation collided with one of the sidelink discovery gaps. Then, in case of collision, the processor further operates the transmission counter such that the colliding retransmission of the data packet does not result in an increment of the transmission counter of the transmission protocol for the data packet.

According to a second aspect which is provided in addition to the first aspect, the user equipment is configured with a sidelink discovery gap for transmission, during which the user terminal can transmit sidelink discovery messages to other user terminals via a sidelink connection. The processor determines that the retransmission of the data packet was not performed because the transmission protocol operation collided with one of the sidelink discovery gaps, when a retransmission of the data packet cannot be transmitted because of colliding with the sidelink discovery gap for transmission; preferably when the user terminal transmits a sidelink discovery message during the sidelink discovery gap for transmission. In addition to, or as an alternative, the user terminal is configured with a sidelink discovery gap for reception, during which the user terminal monitors for sidelink discovery messages transmitted from other user terminals via a sidelink connection. The processor determines that the retransmission of the data packet was not performed because the transmission protocol operation collided with one of the sidelink discovery gaps, when feedback of the transmission protocol relating to a previous transmission of the data packet is not received, because of colliding with the sidelink discovery gap for reception.

According to a third aspect which is provided in addition to the first or second aspects, the transmission protocol provides for the step of incrementing the transmission counter of the transmission protocol by 1 when the retransmission is triggered by the transmission protocol. The processor operates the transmission protocol such that the colliding retransmission of the data packet does not result in an increment of the transmission counter for the data packet, by not performing the step of incrementing the transmission counter by 1 when the retransmission is triggered by the transmission protocol, in case of collision. Alternatively, the processor operates the transmission protocol such that the colliding retransmission of the data packet does not result in an increment of the transmission counter for the data packet, by performing the step of incrementing the transmission counter of the transmission protocol by 1 when the retransmission is triggered by the transmission protocol, and subsequently performing a step of decreasing the transmission counter by 1, in case of collision.

According to a fourth aspect which is provided in addition to one of the first to third aspects, a retransmission of a data packet is triggered according to the transmission protocol, when a buffer associated with the transmission protocol is not empty (and a negative retransmission feedback is pending for the data packet), and/or when receiving an uplink grant from a base station to retransmit the previously transmitted data packet.

According to a fifth aspect which is provided in addition to one of the first to fourth aspects, the user terminal is participating in the sidelink discovery on different frequency carriers than the transmission and retransmission of data packets according to the transmission protocol.

According to a sixth aspect which is provided in addition to one of the first to fifth aspects, the user terminal is configured with a maximum number of allowable transmissions of a data packet. The transmission protocol provides for a step of flushing a buffer of the transmission protocol storing the data packet when the transmission counter reaches the limit of maximum number of allowable transmission of the data packet.

According to a seventh aspect which is provided in addition to one of the first to sixth aspects, the user terminal is configured with at least one measurement gap during which the user terminal can perform channel measurements. The user terminal cannot transmit and/or receive signals under control of the transmission protocol during the measurement gap. The processor is configured to increment the transmission counter of the transmission protocol for the data packet by 1 in case a retransmission, triggered by the transmission protocol, was not performed because the transmission protocol operation collided with the measurement gap.

According to an eight aspect, a user terminal is provided for operating a transmission protocol for uplink data packet transmission in a communication system. A transmission counter is configured for the transmission protocol of the user terminal for counting the number of transmissions the user terminal has performed for a data packet. The user terminal is configured with a first transmission counter parameter setting a maximum number of allowable transmissions of a data packet for the operation of the transmission counter. The user terminal is configured to participate in sidelink discovery operation with other user terminals based on sidelink discovery gaps configured for the user equipment. The user terminal cannot transmit and/or receive signals under control of the transmission protocol when participating in sidelink discovery operation during the sidelink discovery gaps. The user terminal comprises a processor that increments the transmission counter for a data packet when a retransmission of the data packet is triggered by the transmission protocol. The processor further determines whether the triggered retransmission of the data packet was not performed because the transmission protocol operation collided with one of the sidelink discovery gaps. Then, in case of collision, the processor uses for the operation of the transmission counter of the data packet a second transmission counter parameter so as to increase the maximum number of allowable transmissions of the data packet for the transmission counter.

According to a ninth aspect which is provided in addition to the eighth aspect, the user terminal is configured by a base station with the second transmission counter parameter, which is to be applicable to transmission counters that have been incremented by the triggering of a retransmission of a data packet that was not performed because the transmission protocol operation collided with one of the sidelink discovery gaps. Optionally, the second transmission counter parameter indicates a maximum number of allowable transmissions for a data packet that is larger than the maximum number of allowable transmissions for a data packet indicated by the first transmission counter parameter, wherein this increase depends on the length of the sidelink discovery gap.

According to a tenth aspect which is provided in addition to eighth aspect, the second transmission counter parameter is generated by the user terminal by incrementing the first transmission counter parameter every time that the processor determines a collision.

According to an eleventh aspect which is provided in addition to eighth to tenth aspects, the transmission protocol provides for a step of flushing a buffer of the transmission protocol storing the data packet when the transmission counter reaches the maximum number of allowable transmissions set by either the first or the second transmission counter parameter.

According to an twelfth aspect which is provided in addition to eighth to eleventh aspects, the user equipment is configured with a sidelink discovery gap for transmission, during which the user terminal can transmit sidelink discovery messages to other user terminals via a sidelink connection. The processor determines that the retransmission of the data packet was not performed because the transmission protocol operation collided with one of the sidelink discovery gaps, when a retransmission of the data packet cannot be transmitted because of colliding with the sidelink discovery gap for transmission; preferably when the user terminal transmits a sidelink discovery message during the sidelink discovery gap for transmission. In addition to or as an alternative, the user terminal is configured with a sidelink discovery gap for reception, during which the user terminal monitors for sidelink discovery messages transmitted from other user terminals via a sidelink connection. The processor determines that the retransmission of the data packet was not performed because the transmission protocol operation collided with one of the sidelink discovery gaps, when feedback of the transmission protocol relating to a previous transmission of the data packet is not received, because of colliding with the sidelink discovery gap for reception.

According to a thirteenth aspect, a base station is provided for receiving uplink data packet transmissions from a user terminal in a communication system. The terminal operates a transmission protocol for the uplink data packet transmission, wherein a first transmission counter is configured for the transmission protocol of the user terminal for counting the number of transmissions the user terminal has performed for a data packet. A second transmission counter is configured in the base station for counting the number of transmission the user terminal has performed for a data packet. The user terminal is configured by the base station to participate in sidelink discovery operation with other user terminals based on sidelink discovery gaps. The user terminal cannot transmit and/or receive signals under control of the transmission protocol when participating in sidelink discovery operation during the sidelink discovery gaps. The base station comprises a processor that determines whether a retransmissions of a data packet, which is triggered by the transmission protocol of the user terminal, was not performed by the user terminal because the transmission protocol operation collided with one of the sidelink discovery gaps. In case of collision, the processor then operates the second transmission counter such that the colliding transmission of the data packet does not result in an increment of the second transmission counter of the transmission protocol for the data packet.

According to a fourteenth aspect a method is provided for operating a transmission protocol in a user terminal for uplink data packet transmission in a communication system. A transmission counter is configured for the transmission protocol of the user terminal for counting the number of transmissions the user terminal has performed for a data packet. The user terminal is configured to participate in sidelink discovery operation with other user terminals based on sidelink discovery gaps configured for the user equipment. The user terminal cannot transmit and/or receive signals under control of the transmission protocol when participating in sidelink discovery operation during the sidelink discovery gaps. The method comprises determining by the user terminal whether a retransmission of a data packet, which is triggered by the transmission protocol, was not performed because the transmission protocol operation collided with one of the sidelink discovery gaps. In case of collision, the user terminal operates the transmission counter such that the colliding retransmission of the data packet does not result in an increment of the transmission counter of the transmission protocol for the data packet.

According to a fifteenth aspect provided in addition to the fourteenth aspect, the transmission protocol provides for the step of incrementing the transmission counter of the transmission protocol by 1 when the retransmission is triggered by the transmission protocol. The step of operating the transmission protocol such that the colliding retransmission of the data packet does not result in an increment of the transmission counter for the data packet, includes either:

not performing the step of incrementing the transmission counter by 1 when the retransmission is triggered by the transmission protocol, in case of collision, or performing the step of incrementing the transmission counter of the transmission protocol by 1 when the retransmission is triggered by the transmission protocol, and subsequently performing a step of decreasing the transmission counter by 1, in case of collision.

According to a sixteenth aspect provided in addition to the fourteenth or fifteenth aspects, the user terminal is configured with at least one measurement gap during which the user terminal can perform channel measurements. The user terminal cannot transmit and/or receive signals under control of the transmission protocol during the measurement gap. The method further comprises the step of incrementing the transmission counter of the transmission protocol for the data packet by 1 in case a retransmission, triggered by the transmission protocol, was not performed because the transmission protocol operation collided with the measurement gap.

According to a seventeenth aspect, a base station is provided for receiving uplink data packet transmissions from a user terminal in a communication system. The user terminal operates a transmission protocol for the uplink data packet transmission. A first transmission counter is configured for the transmission protocol of the user terminal for counting the number of transmissions the user terminal has performed for a data packet. A second transmission counter is configured in the base station for counting the number of transmission the user terminal has performed for a data packet. A first transmission counter parameter sets a maximum number of allowable transmissions of the data packet for the operation of the first and second transmission counters. The user terminal is configured by the base station to participate in sidelink discovery operation with other user terminals based on sidelink discovery gaps. The user terminal cannot transmit and/or receive signals under control of the transmission protocol when participating in sidelink discovery operation during the sidelink discovery gaps. The base station comprises a processor that increments the second transmission counter for a data packet when a retransmission of the data packet is triggered by the transmission protocol in the user terminal. The processor then determines whether a retransmissions of a data packet, which is triggered by the transmission protocol of the user terminal, was not performed by the user terminal because the transmission protocol operation collided with one of the sidelink discovery gaps. In case of collision, the processor then uses for the operation of the second transmission counter of the data packet a second transmission counter parameter so as to increase the maximum number of allowable transmissions of the data packet for the second transmission counter.

According to an eighteenth aspect, a method is provided for operating a transmission protocol in a user terminal for uplink data packet transmission in a communication system. A transmission counter is configured for the transmission protocol of the user terminal for counting the number of transmissions the user terminal has performed for a data packet. The user terminal is configured with a first transmission counter parameter setting a maximum number of allowable transmissions of a data packet for the operation of the transmission counter. The user terminal is configured to participate in sidelink discovery operation with other user terminals based on sidelink discovery gaps configured for the user equipment. The user terminal cannot transmit and/or receive signals under control of the transmission protocol when participating in sidelink discovery operation during the sidelink discovery gaps. The method comprises incrementing by the user terminal the transmission counter for a data packet when a retransmission of the data packet is triggered by the transmission protocol, and determining whether the triggered retransmission of the data packet was not performed because the transmission protocol operation collided with one of the sidelink discovery gaps. Then, in case of collision, the user terminal uses for the operation of the transmission counter of the data packet a second transmission counter parameter so as to increase the maximum number of allowable transmissions of the data packet for the transmission counter According to a nineteenth aspect provided in addition to the eighteenth aspect, the user terminal is configured by a base station with the second transmission counter parameter, which is to be applicable to transmission counters that have been incremented by the triggering of a retransmission of a data packet that was not performed because the transmission protocol operation collided with one of the sidelink discovery gaps. Optionally, the second transmission counter parameter indicates a maximum number of allowable transmissions for a data packet that is larger than the maximum number of allowable transmissions for a data packet indicated by the first transmission counter parameter, wherein this increase depends on the length of the sidelink discovery gap.

According to a twentieth aspect provided in addition to the eighteenth aspect, the second transmission counter parameter is generated by the user terminal by performing a step of incrementing the first transmission counter parameter every time that the processor determines a collision.

Hardware and Software Implementation of the Present Disclosure

Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A user terminal operating a transmission protocol for:
   uplink data packet transmission in a communication system, wherein a transmission counter is configured for the transmission protocol of the user terminal for counting a number of transmissions the user terminal has performed for a data packet,
   wherein the user terminal is configured to participate in sidelink discovery operation with other user terminals based on sidelink discovery gaps configured for the user terminal, wherein the user terminal does not transmit and/or receive signals under control of the transmission protocol when participating in sidelink discovery operation during the sidelink discovery gaps,
   wherein the user terminal comprises:
   a processor configured to determine whether a retransmission of a data packet, which is triggered by the transmission protocol, was not performed because the transmission protocol operation collided with one of the sidelink discovery gaps, and wherein:
      in case of collision, the processor being configured to operate the transmission counter such that the colliding retransmission of the data packet does not result in an increment of the transmission counter of the transmission protocol for the data packet, and
      the processor being configured to increment the transmission counter of the transmission protocol in response to the retransmission of the data packet being triggered by the transmission protocol, and subsequently decrement the transmission counter of the transmission protocol in response to the retransmission of the data packet not being performed.

2. The user terminal according to claim 1,
   wherein the user terminal is configured with a sidelink discovery gap for transmission, during which the user terminal can transmit sidelink discovery messages to other user terminals via a sidelink connection, wherein the processor determines that the retransmission of the data packet was not performed because the transmission protocol operation collided with one of the sidelink discovery gaps, when:
   a retransmission of the data packet cannot be transmitted because of colliding with the sidelink discovery gap for transmission, when the user terminal transmits a sidelink discovery message during the sidelink discovery gap for transmission,
   and/or
   the user terminal is configured with a sidelink discovery gap for reception, during which the user terminal monitors for sidelink discovery messages transmitted from other user terminals via a sidelink connection, wherein the processor determines that the retransmission of the data packet was not performed because the transmission protocol operation collided with one of the sidelink discovery gaps, when:

feedback of the transmission protocol relating to a previous transmission of the data packet is not received, because of colliding with the sidelink discovery gap for reception.

3. The user terminal according to claim 1, wherein the transmission protocol provides for the step of incrementing the transmission counter of the transmission protocol by 1 when the retransmission is triggered by the transmission protocol, and wherein the processor is configured to operate the transmission protocol such that the colliding retransmission of the data packet does not result in an increment of the transmission counter for the data packet.

4. The user terminal according to claim 1, wherein a retransmission of a data packet is triggered according to the transmission protocol, when:

a buffer associated with the transmission protocol is not empty and a negative retransmission feedback is pending for the data packet, or the user terminal receives an uplink grant from a base station to retransmit a previously transmitted data packet.

5. The user terminal according to claim 1, wherein the user terminal is participating in the sidelink discovery on different frequency carriers than the transmission and retransmission of data packets according to the transmission protocol.

6. The user terminal according to claim 1, wherein the user terminal is configured with a maximum number of allowable transmissions of a data packet, and the transmission protocol provides for a step of flushing a buffer of the transmission protocol storing the data packet when the transmission counter reaches the limit of maximum number of allowable transmissions of the data packet.

7. The user terminal according to claim 1, wherein the user terminal is configured with at least one measurement gap during which the user terminal can perform channel measurements, wherein the user terminal does not transmit and/or receive signals under control of the transmission protocol during the measurement gap.

8. A method for operating a transmission protocol in a user terminal for uplink data packet transmission in a communication system, wherein a transmission counter is configured for the transmission protocol of the user terminal for counting a number of transmissions the user terminal has performed for a data packet, wherein the user terminal is configured to participate in sidelink discovery operation with other user terminals based on sidelink discovery gaps configured for the user terminal, wherein the user terminal does not transmit and/or receive signals under control of the transmission protocol when participating in sidelink discovery operation during the sidelink discovery gaps, wherein the method comprises the following steps performed by the user terminal:

determining whether a retransmission of a data packet, which is triggered by the transmission protocol, was not performed because the transmission protocol operation collided with one of the sidelink discovery gaps, and in case of collision, operating the transmission counter such that the colliding retransmission of the data packet does not result in an increment of the transmission counter of the transmission protocol for the data packet by incrementing the transmission counter of the transmission protocol in response to the retransmission of the data packet being triggered by the transmission protocol, and subsequently decrementing the transmission counter of the transmission protocol in response to the retransmission of the data packet not being performed.

9. The method according to claim 8, wherein the transmission protocol provides for the step of incrementing the transmission counter of the transmission protocol by 1 when the retransmission is triggered by the transmission protocol, and wherein the step of operating the transmission protocol such that the colliding retransmission of the data packet does not result in an increment of the transmission counter for the data packet.

10. The method according to claim 8, wherein the user terminal is configured with at least one measurement gap during which the user terminal can perform channel measurements, wherein the user terminal does not transmit and/or receive signals under control of the transmission protocol during the measurement gap.

* * * * *